(12) United States Patent
Suwa et al.

(10) Patent No.: US 11,970,108 B2
(45) Date of Patent: Apr. 30, 2024

(54) HEADLIGHT DEVICE

(71) Applicant: Mitsubishi Electric Corporation, Tokyo (JP)

(72) Inventors: Masashige Suwa, Tokyo (JP); Ritsuya Oshima, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/766,742

(22) PCT Filed: Nov. 13, 2019

(86) PCT No.: PCT/JP2019/044499
§ 371 (c)(1),
(2) Date: Apr. 6, 2022

(87) PCT Pub. No.: WO2021/095156
PCT Pub. Date: May 20, 2021

(65) Prior Publication Data
US 2024/0083345 A1  Mar. 14, 2024

(51) Int. Cl.
*B60Q 1/14* (2006.01)
*B60Q 1/00* (2006.01)
(Continued)

(52) U.S. Cl.
CPC .......... *B60Q 1/143* (2013.01); *B60Q 1/0023* (2013.01); *F21S 41/143* (2018.01); *F21S 41/148* (2018.01);
(Continued)

(58) Field of Classification Search
CPC ........ F21S 41/663; F21S 41/27; F21S 41/143; F21S 41/148; B60Q 1/0023; B60Q 1/143
See application file for complete search history.

(56) References Cited

U.S. PATENT DOCUMENTS 9,855,887 B1 * 1/2018 Potter ................ F21S 41/675
10,677,442 B2 * 6/2020 Nakao ..................... H05K 7/20
(Continued)

FOREIGN PATENT DOCUMENTS

JP  2010-217241 A  9/2010
JP  2012-166633 A  9/2012
(Continued)

OTHER PUBLICATIONS

International Search Report and Written Opinion dated Feb. 4, 2020, received for PCT Application PCT/JP2019/044499, Filed on Nov. 13, 2019, 9 pages including English Translation.

*Primary Examiner* — Matthew J. Peerce
(74) *Attorney, Agent, or Firm* — XSENSUS LLP

(57) ABSTRACT

A headlight device includes a light source unit to emit first light, a first optical unit to change a light distribution pattern of incident first light, a light-reception unit to detect incident second light, a second optical unit to project the light distribution pattern in a predetermined projection direction and receive incident light traveling in a direction opposite to the projection direction, a third optical unit to emit the first light toward the second optical unit and emit incident light that has passed through the second optical unit as second light toward the light-reception unit, and a fourth optical unit to focus the second light and direct toward the light-reception unit. The light distribution pattern is controlled based on a detection result of second light in the light-reception unit.

11 Claims, 11 Drawing Sheets

(51) Int. Cl.
*F21S 41/143* (2018.01)
*F21S 41/148* (2018.01)
*F21S 41/27* (2018.01)
*F21S 41/663* (2018.01)

(52) U.S. Cl.
CPC ............ *F21S 41/27* (2018.01); *F21S 41/663* (2018.01); *B60Q 2300/056* (2013.01)

(56) References Cited

U.S. PATENT DOCUMENTS

2012/0206043 A1 8/2012 Yamazaki et al.
2014/0169010 A1 6/2014 Imaeda
2017/0227184 A1 8/2017 Ishida et al.
2018/0264990 A1 9/2018 Mouri et al.

FOREIGN PATENT DOCUMENTS

| JP | 2013-191478 A | 9/2013 |
| JP | 2016-39020 A | 3/2016 |
| JP | 2018-24374 A | 2/2018 |
| JP | 2018-156862 A | 10/2018 |
| WO | 98/54030 A1 | 12/1998 |
| WO | 2013/015213 A1 | 1/2013 |

\* cited by examiner

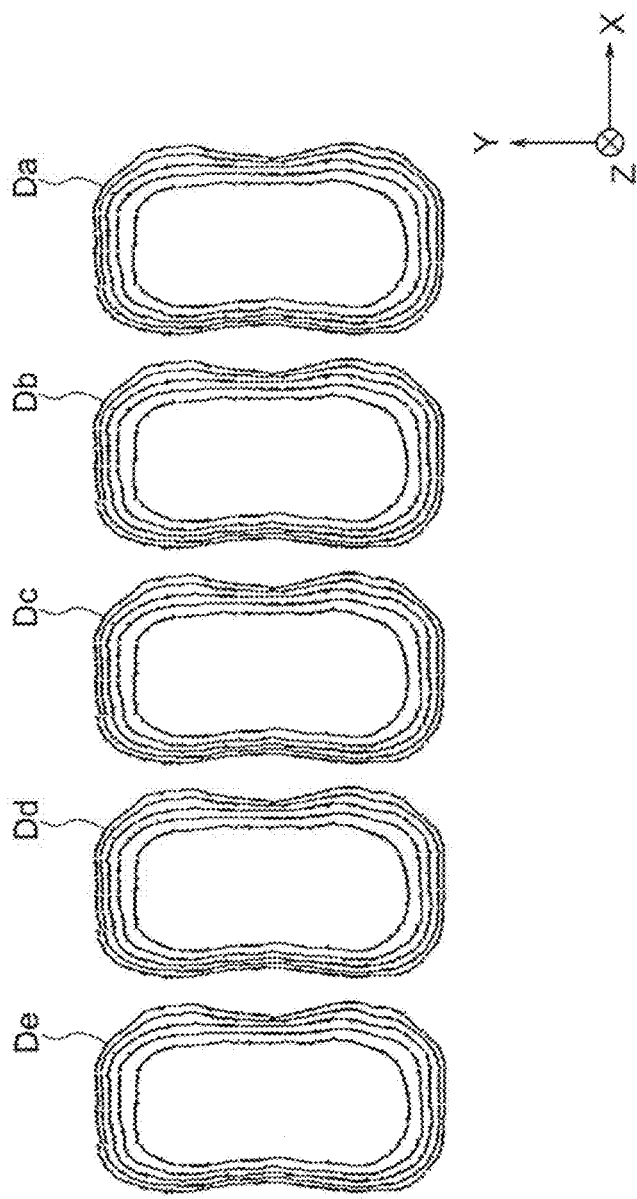

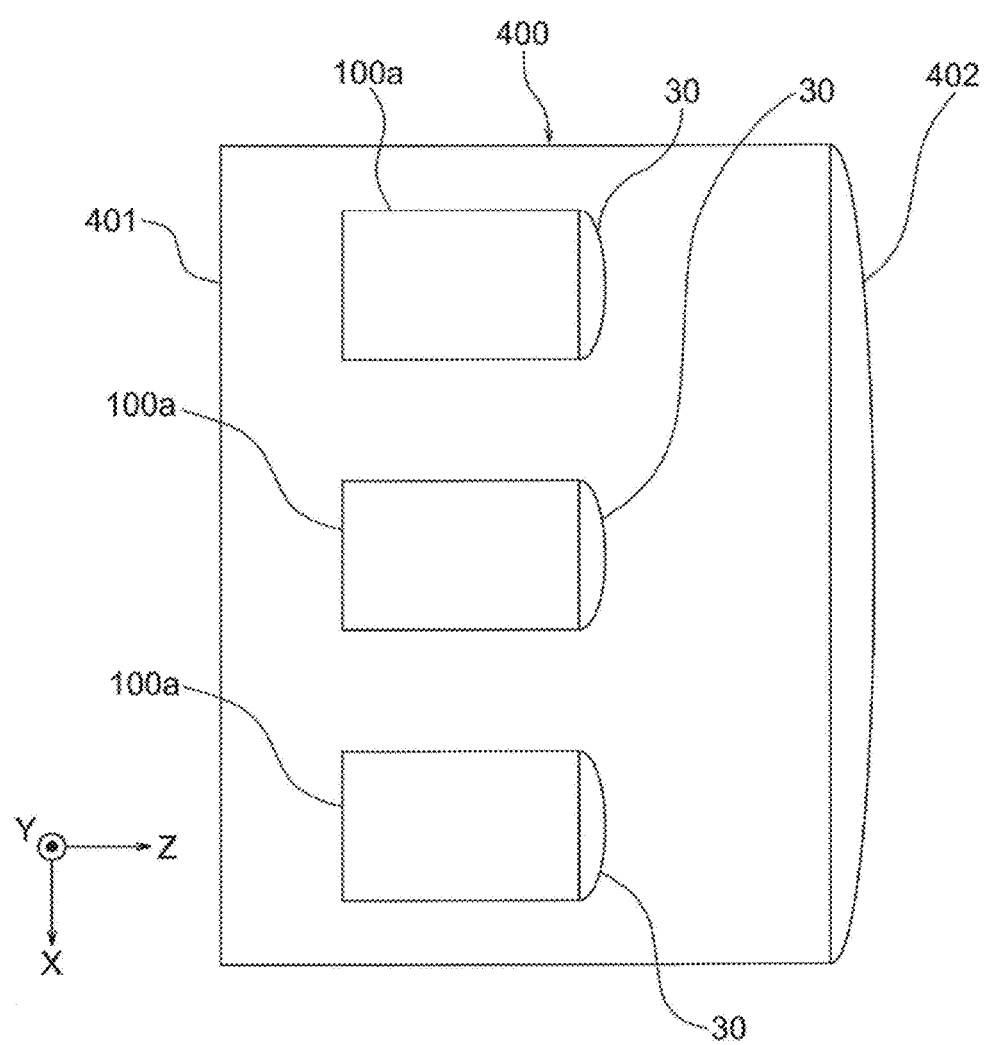

HEADLIGHT DEVICE

CROSS-REFERENCE TO RELATED APPLICATION

The present application is based on PCT filing PCT/JP2019/044499, filed Nov. 13, 2019, the entire contents of which are incorporated herein by reference.

TECHNICAL FIELD

The present invention relates to a headlight device.

BACKGROUND ART

A proposed headlight device controls a light distribution pattern of light emitted from a lamp unit, such as adaptive driving beam (ADB) control, in order to prevent glare to a driver of another vehicle located in a light emission direction (see, for example, Patent Reference 1). In Patent Reference 1, a light distribution pattern is switched to apply light to a target region and not to apply light to the other region, based on an image obtained by a camera.

PRIOR ART REFERENCE

Patent Reference

Patent Reference 1: Japanese Patent Application Publication No. 2012-166633

SUMMARY OF THE INVENTION

Problem to be Solved by the Invention

In Patent Reference 1, however, the camera is disposed at a position different from a lamp unit of the headlight device. That is, in Patent Reference 1, an optical axis of the lamp unit is different from an optical axis of the camera. Thus, in Patent Reference 1, a visual field of the camera and an irradiated region of the light distribution pattern of light emitted from the lamp unit coincide with each other in a limited range. In view of this, calibration for causing the visual field of the camera and the irradiated region of the light distribution pattern to coincide with each other is needed. In the case of also performing ADB control on other vehicles located in a range other than the range at which the visual field of the camera and the irradiated region of the light distribution pattern coincide with each other, a shift occurs between the visual field of the camera and the irradiated region of the light distribution pattern, and thus, an extinguish area has to be increased more than necessary.

The present invention has been made in order to solve the problems described above, and has an object of providing a headlight device that suppresses occurrence of a shift between a visual field for detecting another vehicle located in a light emission direction (i.e., visual field of a sensor) and an irradiated region of a light distribution pattern, and, based on sensor information that is a result of the detection, enhances accuracy of control of the light distribution pattern.

Means of Solving the Problem

A headlight device according to an aspect of the present invention includes: a light source unit to emit first light; a first optical unit to change a light distribution pattern of the first light incident on the first optical unit; a light-reception unit to detect incident second light; a second optical unit to project the light distribution pattern in a predetermined projection direction and receive incident light traveling in a direction opposite to the projection direction; a third optical unit to emit the first light toward the second optical unit and emit the incident light that has passed through the second optical unit as the second light traveling toward the light-reception unit; and a fourth optical unit to focus the second light emitted from the third optical unit and direct toward the light-reception unit, wherein a part of an optical axis of a projection optical system including the light source unit, the first optical unit, and the second optical unit coincides with a part of an optical axis of an image pickup optical system including the second optical unit, the fourth optical unit, and the light-reception unit, and the light distribution pattern is controlled based on a detection result of the second light in the light-reception unit.

Effects of the Invention

The present invention can provide a headlight device that suppresses occurrence of a shift between the visual field of a sensor and an irradiated region of a light distribution pattern and enhances accuracy in control of a light distribution pattern of emitted light based on sensor information.

BRIEF DESCRIPTION OF THE DRAWINGS

FIG. 5 is a diagram illustrating an example of a plurality of light distribution patterns respectively corresponding to a plurality of light emitting faces illustrated in FIG. 3.

FIG. 15 is a side view schematically illustrating a main configuration of a headlight device according to a fourth embodiment of the present invention.

MODE FOR CARRYING OUT THE INVENTION

Headlight devices according to embodiments of the present invention will be described hereinafter with reference to the drawings. The following embodiments are merely examples, and various changes may be made within the scope of the present invention.

The headlight devices according to the embodiments are, for example, headlight devices for vehicles. The vehicles are, for example, four-wheeled motor vehicles, three-wheeled motor vehicles, and motorcycles or the like.

The following description provides a description of a case, as an example, where an irradiation state of light from a headlight device according to an embodiment is a high beam headlight showing an irradiation state of light for traveling. Light emitted by the high beam headlight has a light distribution pattern having a wider range and a higher luminance than light emitted by a low beam headlight showing an irradiation state of light for passing. Thus, when light is emitted from the headlight device by the high beam headlight, the field of view of a driver of a vehicle including this headlight device is clear. Light emitted by the high beam headlight, however, might cause glare to drivers of a preceding vehicle and an oncoming vehicle. To prevent this glare, the headlight devices according to the embodiments perform control of adjusting a light distribution pattern, for example, ADB control. In the headlight devices according to the embodiment, a distribution pattern of light emitted by a high beam headlight is adjusted so that a target range (e.g., range except for a preceding vehicle and an oncoming vehicle) coincides with a light irradiated region.

The drawings show coordinate axes of an xyz orthogonal coordinate system for easy understanding of description. The X axis is a coordinate axis parallel to the left-right direction of the vehicle. That is, the X-axis directions are the lateral directions of the vehicle. When seen forward of the vehicle, the leftward direction is a −X-axis direction, and the rightward direction is a +X-axis direction. The Y axis is a coordinate axis parallel to the top-bottom direction of the vehicle. The upward direction of the vehicle is a +Y-axis direction, and the downward direction of the vehicle is a −Y-axis direction. That is, the +Y-axis side of the vehicle is the sky side, and the −Y-axis side is a road side. The Z axis is a coordinate axis orthogonal to the X axis and the Y axis. The Z-axis direction is a traveling direction of the vehicle. In the following description, the "+Z-axis direction" will also be referred to as "forward."

First Embodiment

<Configuration of Headlight Device>

Figure 1:
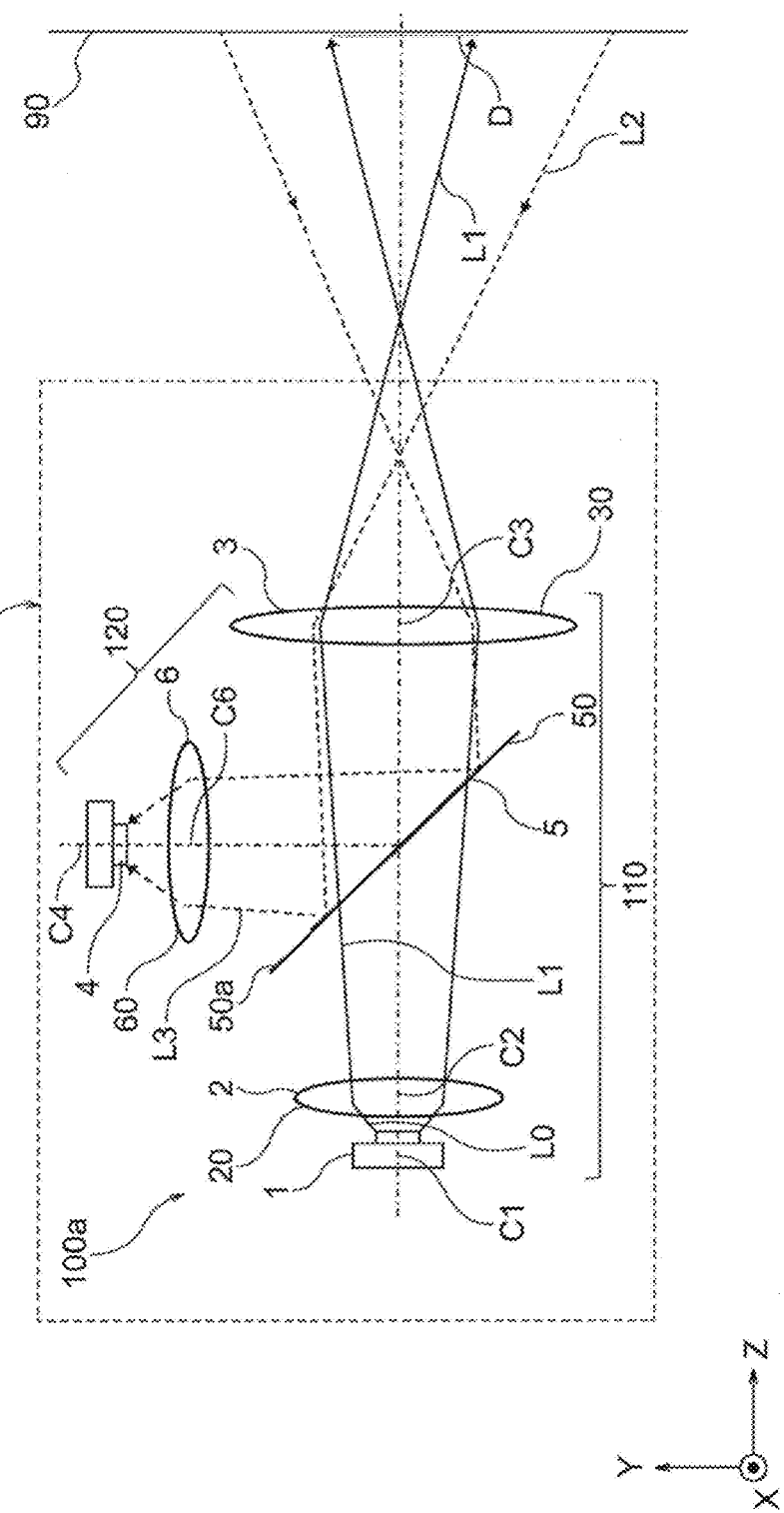
FIG. 1 is a side view schematically illustrating a main configuration of a headlight device according to a first embodiment of the present invention.
Figure 2:
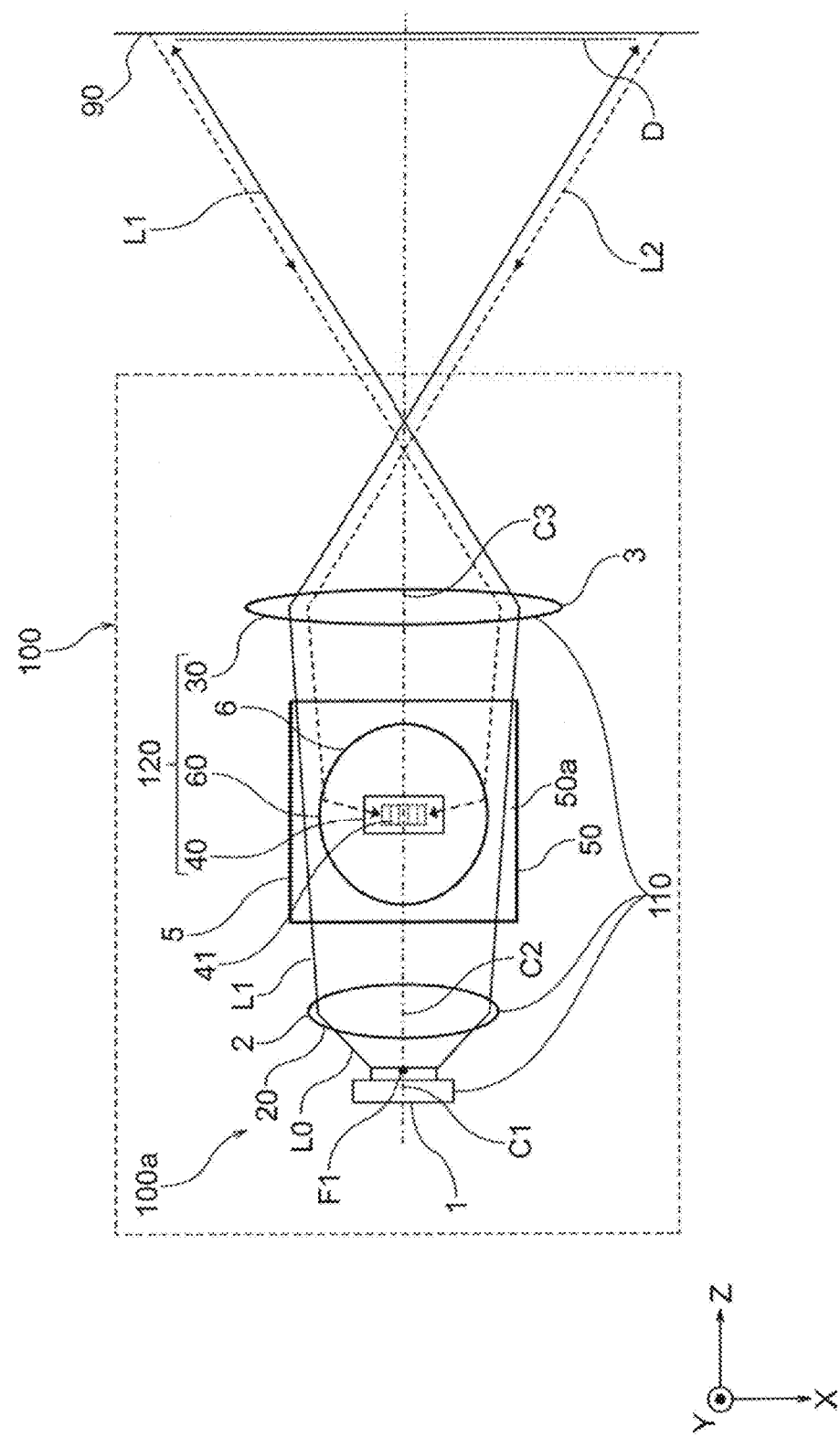
FIG. 2 is a plan view schematically illustrating a main configuration of the headlight device according to the first embodiment.

FIG. 1 is a side view schematically illustrating a main configuration of a headlight device 100 according to a first embodiment. FIG. 2 is a plan view schematically illustrating a main configuration of the headlight device 100 according to the first embodiment. In the first embodiment, an example in which the headlight device 100 includes one headlight module 100a will be described. Thus, in the first embodiment, the headlight device 100 will also be referred to as the headlight module 100a.

As illustrated in FIGS. 1 and 2, the headlight device 100 includes a light source unit 1, a first optical unit 2, a second optical unit 3, a light-reception unit 4, a third optical unit 5, and a fourth optical unit 6. The headlight device 100 is not limited to the configuration illustrated in FIGS. 1 and 2.

Figure 3:
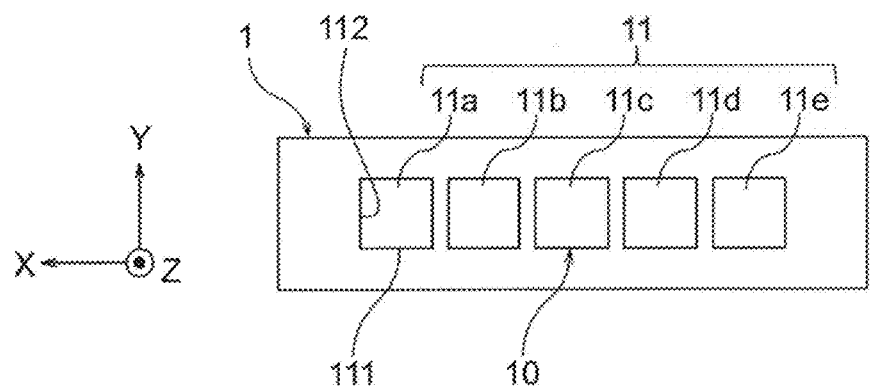
FIG. 3 is a diagram illustrating a configuration of a light source unit illustrated in FIGS. 1 and 2.

FIG. 3 is a diagram illustrating a configuration of the light source unit 1 illustrated in FIGS. 1 and 2. FIG. 3 is a diagram of the light source unit 1 illustrated in FIGS. 1 and 2 when seen from the +Z-axis side. As illustrated in FIG. 3, the light source unit 1 may include a plurality of light-emitting devices 10. The light-emitting devices 10 are solid light sources. The solid light sources are light sources each having directivity. The solid light sources are, for example, semiconductor light sources. In FIG. 3, the light-emitting devices 10 are light-emitting diodes. The solid light sources may be organic electroluminescence light sources or light sources that emit Light by irradiating a phosphor applied on to a plane with excitation light.

In the following description, the surfaces of the light-emitting devices 10 at the +Z-axis side will be hereinafter referred to as light emitting faces 11. The light source unit 1 includes a plurality of light emitting faces 11. The plurality of light emitting faces 11 include N light emitting faces 11 arranged in a predetermined arrangement direction. In FIG. 3, N is five. It is sufficient that N is an integer of two or more. The arrangement direction of the plurality of light emitting faces 11 are the X-axis direction. In the following description, the plurality of light emitting faces 11 arranged in the X-axis direction will also be referred to as 11a, 11b, 11c, 11d, and 11e. In the example illustrated in FIG. 3, the plurality of light emitting faces 11 are linearly aligned. The number of the light emitting faces 11 included in the light source unit 1 may be one. The light source unit 1 may have a configuration for adjusting light distribution, such as a movable light shield plate (not shown).

Each of the light emitting faces 11 has, for example, rectangular shape. In FIG. 3, in each of the light emitting faces 11, the length of a side 111 extending in the X-axis direction is equal to a side 112 extending in the Y-axis direction. That is, in FIG. 3, each of the light emitting faces 11 has square shape. The shape of the light emitting faces 11 is not limited to square and rectangle.

As illustrated in FIGS. 1 and 2, the first optical unit 2 is located at the light emission side (+Z-axis side in this example) at which the light source unit 1 emits light L0. The light L0 enters the first optical unit 2. The first optical unit 2 changes a light distribution pattern of the incident light L0. The first optical unit 2 is, for example, a light distribution changing lens 20. The first optical unit 2 may be constituted by a reflection mirror. The light distribution changing lens 20 is, for example, a lens having positive power.

The light distribution changing lens 20 is, for example, a convex lens. As the light distribution changing lens 20, a convex lens may be used. The light distribution changing lens 20 is formed of, for example, a transparent resin. In FIGS. 1 and 2, the light distribution changing lens 20 is constituted by a single lens. The light distribution changing lens 20 may be a lens group of a plurality of lenses.

In FIG. 1, the optical axis of the light source unit 1 is denoted by C1. The optical axis of the light distribution changing lens 20 is denoted by C2. The optical axis C1 and the optical axis C2 are on the same line. That is, the optical axis C1 and the optical axis C2 coincide with each other. The optical axis C1 of the light source unit 1 and the optical axis C2 of the light distribution changing lens 20 do not need to be located on the same line, and it is sufficient that the optical axis of the light L0 emitted by the light source unit 1 and the optical axis C2 of the light distribution changing lens 20 coincide with each other at least on the Z axis of the light distribution changing lens 20. The light distribution changing lens 20 may have rotational asymmetry. An example of the light distribution changing lens 20 will be described later with reference to FIGS. 10A and 10B and FIGS. 11A and 11B. In the following description, light L0 that is first light emitted from the light distribution changing lens 20 is represented as light 11. Light L1 travels in the +Z-axis direction, and enters a projector lens 30 after passing through a beam splitter 50.

The second optical unit 3 projects a light distribution pattern of light L1 formed by the light distribution changing lens 20 in a predetermined projection direction (i.e., +Z-axis direction). The second optical unit 3 is, for example, the projector lens 30. The second optical unit 3 may be a reflection mirror or a combination of a reflection mirror and a lens. In this example, the projector lens 30 is located at the +Z-axis side of the light source unit 1 and the light distribution changing lens 20. In the Z-axis direction, the distance from the light source unit 1 to the projector lens 30 is, for example, 50 mm or less. Light L1 incident on the projector lens 30 passes through the projector lens 30 and is emitted toward a predetermined irradiated region located forward of the projector lens 30. The "predetermined irradiated region" herein may be a predetermined region on an irradiated plane 90 disposed at the +Z-axis side (projection direction side) of the projector lens 30.

The irradiated plane 90 is an imaginary projection plane on which a light distribution pattern of light L1 that has been changed by the light distribution changing lens 20 is projected. Here, the location of the irradiated plane 90 is a location at which luminance or luminous intensity of the headlight device 100 is measured. In the vehicle headlight device, the location at which luminance or luminous intensity of the headlight device is measured is previously determined according to a road traffic rules or the like. For example, the measurement location of luminous intensity of the headlight device defined by the united nations economic commission for Europe (UNECE) is a location at a distance of 25 m from the light source of the headlight device, and the measurement location of luminous intensity defined by the Japanese industrial standards (JIS) is a location at a distance of 10 m from the light source of the headlight device. In the first embodiment, the irradiated plane 90 is disposed at a distance of 25 m from the light source unit 1 of the headlight device 100 in the +Z-axis direction. In the following description, a light distribution pattern of light L1 projected onto the irradiated plane 90 is denoted by D.

The projector lens 30 projects the light distribution pattern D of light L1 onto the irradiated plane 90. The projector lens 30 is, for example, a lens having positive power. In FIGS. 1 and 2, the projector lens 30 is constituted by a single lens. The projector lens 30 may be a lens group of a plurality of lenses. In the case where the projector lens 30 is the lens group, as the number of lenses increases, efficiency of light utilization decreases. For this reason, the projector lens 30 is preferably constituted by one or two lenses. The projector lens 30 is formed of, for example, a transparent resin or the like.

In FIGS. 1 and 2, the optical axis of the projector lens 30 is denoted by C3. The projector lens 30 may have rotation symmetry about the optical axis C3. Here, the optical axis C1 and the optical axis C3 of the light source unit 1 are located on the same line. That is, the optical axis C1 and the optical axis C3 coincide with each other. The optical axis C2 and the optical axis C3 of the light distribution changing lens 20 are located on the same line. That is, the optical axis C2 and the optical axis C3 coincide with each other.

Incident light L2 traveling in the direction (−Z-axis direction) opposite to the projection direction enters the projector lens 30. Incident light L2 passes through the projector lens 30, is reflected by the beam splitter 50, and then enters the light-reception unit 4 as light L3.

The light-reception unit 4 is disposed between the light distribution changing lens 20 and the projector lens 30 in the Z-axis direction. The light-reception unit 4 is a light detector that detects light L3 as second light emitted from a predetermined light receiving region located forward and incident through the projector lens 30. The light L3 is detected light detected by the light-reception unit 4. The "predetermined light receiving region" herein may be a predetermined region located at the +Z-axis side (projection direction side) of the projector lens 30. The predetermined light receiving region may be, for example, a region including at least the "predetermined irradiated region" described above. For example, in a case where an object emitting light is present in an irradiated region irradiated with light L1 and located at the +Z-axis side of the projector lens 30, light L3 may be light emitted from this object. As an example, in a case where an oncoming car is present in a predetermined light receiving region located forward, light L3 may be light emitted from a headlight of this oncoming vehicle. In a case where the predetermined light receiving region located forward includes a preceding vehicle, light L3 may be light emitted from a taillight of this preceding vehicle. In a case where an object reflecting light is present in an irradiated region irradiated with light L1 and located at the +Z-axis side of the projector lens 30, for example, the light L3 may be light L1 reflected by this object. As an example, in a case where a pedestrian wearing a reflector or a road surface or a guardrail coated with a reflector or the like, is present in a predetermined light receiving region located forward, light L3 may be light reflected by these objects. As described above, an object serving as an emission point of light L3 can be any object (e.g., a road surface, an oncoming vehicle, a preceding vehicle, and a pedestrian) located at the +Z-axis side of the projector lens 30. As will be described later, the detection timing at the light-reception unit 4 may be different from the light emission timing at the light source unit 1 so that light L3 can be limited to light emitted from another object (i.e., reflected light of light L1 can be excluded from light L3).

Figure 4:
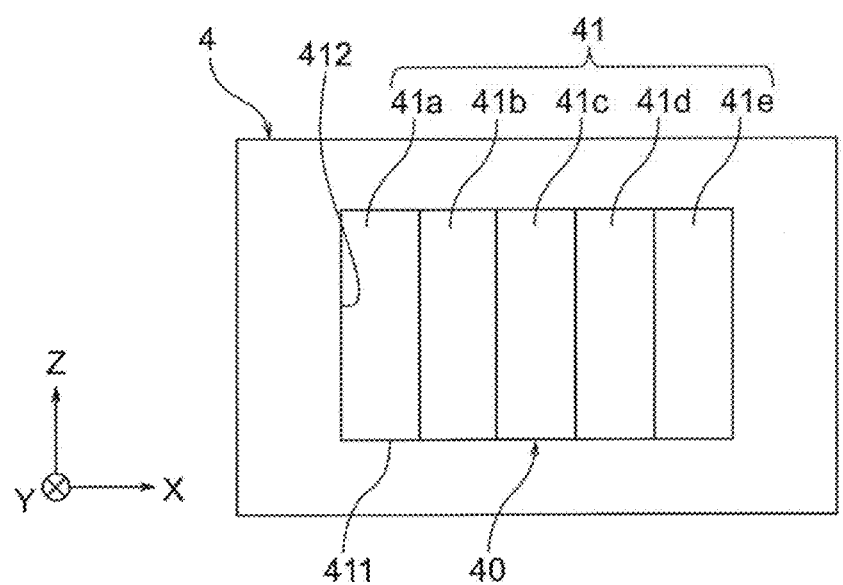
FIG. 4 is a diagram illustrating a configuration of a light-reception unit illustrated in FIGS. 1 and 2.

FIG. 4 is a diagram illustrating a configuration of the light-reception unit 4 illustrated in FIGS. 1 and 2. FIG. 4 is a diagram of the light-reception unit 4 illustrated in FIGS. 1 and 2 when seen from the −Y-axis side. As illustrated in FIG. 4, the light-reception unit 4 may include a plurality of light-receiving devices 40. Each of the light-receiving devices 40 is, for example, a semiconductor element device that converts energy of received light to an electrical signal. The light-receiving devices 40 are, for example, photodiodes, charge coupled device (CCD) image sensors, or complementary metal oxide semiconductor (CMOS) image sensors or the like. The light-reception unit 4 may be a line sensor including the plurality of light-receiving devices 40. In the following description, the surface each light-receiving device 40 of the light-receiving devices 40 at the −Y-axis side will be referred to as light receiving face 41.

The light-reception unit 4 includes the plurality of light receiving faces 41 arranged in the X-axis direction. In the following description, the plurality of light receiving faces 41 arranged in the X-axis direction will also be referred to as 41a, 41b, 41c, 41d, and 41e. The plurality of light receiving faces 41 include M light receiving faces 41 arranged in a direction corresponding to the arrangement direction of the plurality of light emitting faces 11. The "direction corresponding to the arrangement direction of the plurality of light emitting faces 11" here has a meaning covering a direction parallel to the arrangement direction of the plurality of light emitting faces 11 and a direction that is not parallel to the arrangement direction of the light emitting faces 11 and is tilted. In FIG. 4, the plurality of light receiving faces 41 are arranged in the X-axis direction parallel to the direction in which the plurality of light emitting faces 11 are arranged. In FIG. 4, M is five. In the first embodiment, the number M of the plurality of light receiving faces 41 is equal to the number N of the plurality of light emitting faces 11 illustrated in FIG. 3. Thus, in the first embodiment, the plurality of light receiving faces 41 and the plurality of plurality of light emitting faces 11 have one-to-one correspondence. In addition, M is preferably an integer of two or more. One light receiving face 41 may be included in the light-reception unit 4.

As illustrated in FIG. 4, the plurality of light receiving faces 41 may be linearly aligned. The light receiving faces 41 are, for example, rectangular. In the example illustrated in FIG. 4, in each of the light receiving faces 41, a side 412 extending in the Z-axis direction is longer than a side 411 extending in the X-axis direction. That is, each of the light receiving faces 41 is rectangular elongated in the Z-axis direction. This shape is intended to accurately detect a vehicle forward or a pedestrian as a moving object by providing a margin in the top-bottom direction (i.e., Z-axis direction) of the light receiving faces 41. The shapes of the light receiving faces 41 are not limited to squares and rectangles.

As illustrated in FIG. 1, the third optical unit 5 is an optical member disposed between the light distribution changing lens 20 and the projector lens 30 in the Z-axis direction. The third optical unit 5 is, for example, the beam splitter 50. The third optical unit 5 may be constituted by a dichroic mirror. The beam splitter 50 emits incident light L1 in the +Z-axis direction. The light source unit 1 is disposed at the −Z-axis side of the beam splitter 50. The beam splitter 50 emits light L1 incident from the −Z-axis side, to the +Z-axis direction as illuminating light. In the following description, the "+Z-axis direction" will also be referred to as an "emission direction."

The light-reception unit 4 is disposed at the +Y-axis side of the beam splitter 50. The beam splitter 50 guides incident light L2 incident through the projector lens 30, to the light-reception unit 4. Specifically, the beam splitter 50 emits incident light L2 traveling in the direction (i.e., the −Z-axis direction) opposite to the emission direction of light L1, as light L3 traveling toward the light-reception unit 4. In the first embodiment, the beam splitter 50 allows Light L1 to pass therethrough to emit light L1 in the emission direction, and reflects incident light L2 to emit the incident light L2 as light L3 traveling toward the light-reception unit 4.

In FIG. 1, the beam splitter 50 has the property of allowing light L1 to pass therethrough, that is, light transmittance. The beam splitter 50 includes a surface 50a on which incident light L2 is reflected. The angle of the surface 50a to the optical axis C1 is 45 degrees. This angle is not limited to 45 degrees. Incident light L2 is reflected by the surface 50a to thereby travel in the +Y-axis direction as light L3 traveling toward the light-reception unit 4.

In the first embodiment, the surface 50a reflects incident light L2 by Fresnel reflection. The surface 50a may be a surface with semitransparent mirror coating or the like. In the case where the surface 50a is a surface on which incident light L2 is reflected by Fresnel reflection, light transmittance is enhanced as compared to a case where the surface 50a is provided with semitransparent mirror coating. Thus, light L1 efficiently enters the projector lens 30.

The fourth optical unit 6 is disposed between the beam splitter 50 and the light-reception unit 4 in the Y-axis direction. Light L3 enters the fourth optical unit 6. The fourth optical unit 6 focuses incident light L3 and directs the light toward the light-reception unit 4. The fourth optical unit 6 is, for example, a condenser lens 60. The fourth optical unit 6 may be constituted by a reflection mirror. The condenser lens 60 is, for example, a lens having positive power. The condenser lens 60 is, for example, a convex lens. Since the condenser lens 60 and the projector lens 30 have positive power, light L3 that has entered the condenser lens 60 through the projector lens 30 and the beam splitter 50 forms an image on the light-reception unit 4. Thus, the condenser lens 60 is a lens for forming an image of scenery ahead of the vehicle including the headlight device 100 on the light-reception unit 4. For this reason, the condenser lens 60 has power different from power of the light distribution changing lens 20.

In FIG. 1, the optical axis of the light-reception unit 4 is denoted by C4, and the optical axis of the condenser lens 60 is denoted by C6. The optical axis C4 and the optical axis C6 are located on the same line. That is, the optical axis C4 and the optical axis C6 coincide with each other. In the first embodiment, the condenser lens 60 may have a rotational symmetric shape about the optical axis C6 as the rotation axis. The optical axis C6 coincides with the optical axis C3 of the projector lens 30 at the +Z-axis side of the beam splitter 50.

The light source unit 1 of the headlight device 100, the light distribution changing lens 20, and the projector lens 30 constitute a projection optical system 110 that projects light L1 as illuminating light toward a predetermined irradiated region forward of the vehicle including the headlight device 100. The projector lens 30, the condenser lens 60, and the light-reception unit 4 of the headlight device 100 constitute an image pickup optical system 120 that takes an image of scenery forward of the vehicle including the headlight device 100. That is, the projection optical system 110 and the image pickup optical system 120 share the projector lens 30 that is the second optical unit 3.

As described above, the optical axis C6 of the condenser lens 60 constituting the image pickup optical system 120 coincides with the optical axis C3 of the projector lens 30 constituting the projection optical system 110 at the +Z-axis side of the beam splitter 50. That is, a part of the optical axis of the projection optical system 110 coincides with a part of the optical axis of the image pickup optical system 120.

Since the projection optical system 110 and the image pickup optical system 120 share a part of the optical axes and use the common projector lens 30, an irradiation range of light L1 from the headlight device 100 and an incident range of incident light L2 incident on the headlight device 100 can be easily made coincide with each other. Thus, it is possible to suppress occurrence of a shift between a visual field for detecting a vehicle located in the irradiation direction of light L1 and the irradiation range of the light distribution pattern of light L1.

In the configuration of the headlight device 100 described above, the light source unit 1 is disposed at the −Z-axis side of the beam splitter 50, and the light-reception unit 4 is disposed at the +Y-axis side of the beam splitter 50. Thus, although the beam splitter 50 is an optical member that allows light L1 to pass therethrough to emit light L1 in the +Z-axis direction and reflects incident light L2 toward the light-reception unit 4, the beam splitter 500 may be another optical member. For example, in the headlight device 100, the light-reception unit 4 may be disposed at the −Z-axis side of the beam splitter 50 with the light source unit 1 being disposed at the +Y-axis side of the beam splitter 50. That is, the beam splitter 50 may be an optical member that reflects light L1 to emit light L1 in the +Z-axis direction and allows incident light L2 to pass therethrough and to direct it to the light-reception unit 4.

<Light Distribution Pattern>

Figure 6A:
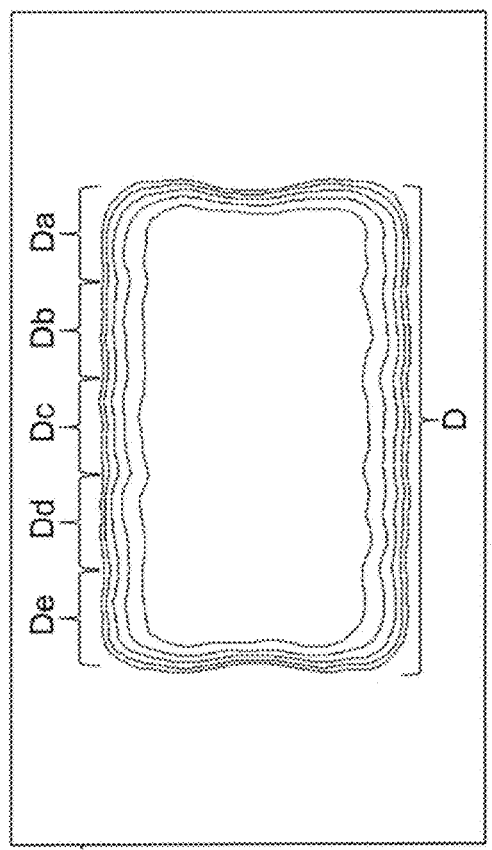
FIG. 6A is a diagram illustrating an example of a light distribution pattern of first light projected on an imaginary projection plane.

Next, the light distribution pattern D of light L1 shown in FIGS. 1 and 2 will be described. FIG. 5 is a diagram illustrating examples of a plurality of light distribution patterns Da through De respectively corresponding to the plurality of light emitting faces 11a through 11e illustrated in FIG. 3. FIG. 6A is a diagram illustrating an example of the light distribution pattern D of light L1.

The plurality of light distribution patterns Da through De illustrated in FIG. 5 are light distribution patterns of a plurality of light beams L0 respectively emitted from the plurality of light emitting faces 11a through 11e. For example, the light distribution pattern Da is a light distribution pattern of light emitted from the light emitting faces 11a. The plurality of light distribution patterns Da through De of light before entering the light distribution changing lens 20 have square shapes analogous to the shapes of the plurality of light emitting faces 11a through 11e, for example. The plurality of light distribution patterns Da through De are synthesized while being changed to rectangular shapes through the light distribution changing lens 20 (also referred to as "shaped"), and as the result, the light distribution pattern D of light L1 as illustrated in FIG. 6A, for example, is formed and projected onto the irradiated plane 90.

FIG. 5 shows a simulation result before the synthesis of the plurality of light distribution patterns Da through De through the light distribution changing lens 20. FIG. 6A is a diagram showing a simulation result of the light distribution pattern D projected onto the irradiated plane 90 when all the plurality of light emitting faces 11a through 11e illustrated in FIG. 3 are turned on.

Here, the plurality of light emitting faces 11 illustrated in FIG. 3 correspond to the plurality of light receiving faces 41 illustrated in FIG. 4. Specifically, a plurality of regions in which the plurality of light distribution patterns Da through De are projected onto the irradiated plane 90 correspond to a plurality of detection regions of light L3 detected by the plurality of light receiving faces 41. That is, light L3 incident on the plurality of light receiving faces 41 (illustrated in FIG. 1) is emitted from the plurality of regions in which the plurality of light distribution patterns Da through De (illustrated in FIG. 6A) are projected onto the irradiated plane 90.

As illustrated in FIG. 4 and FIG. 6A, the light receiving faces 41a, 41b, 41c, 41d, and 41e detect incident light emitted from locations overlapping with locations onto which the light distribution patterns Da, Db, Dc, Dd, and De are projected (i.e., part of incident light L2). Each of the plurality of light receiving faces 41a through 41e outputs a detection result (e.g., detection signal corresponding to detected light) to the controller 7 illustrated in FIGS. 1 and 2. The detection result may be, for example, a signal indicating the amount of received light or a flag indicating whether or not the amount of received light is greater than or equal to a predetermined threshold T1. The above described detection result is merely a example. The controller 7 performs control of turning off light on the light emitting face 11 corresponding to the light receiving face 41 in which light having an amount of received light greater than or equal to the predetermined threshold T1 is detected among the plurality of light emitting faces 11, and illuminating the other light emitting faces 11.

Figure 6B:
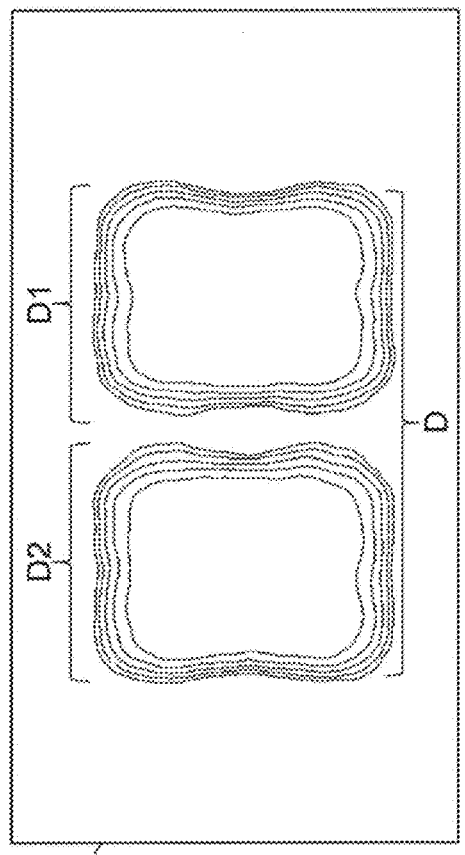
FIG. 6B is a diagram illustrating another example of the light distribution pattern of first light projected on the imaginary projection plane.

FIG. 6B is a diagram illustrating another example of the light distribution pattern D of light L1. FIG. 6B shows a simulation result of the light distribution pattern D projected onto the irradiated plane 90 when the four light emitting faces 11a, 11b, 11d, and 11e shown in FIG. 3 are turned on. That is, in FIG. 6B, the light emitting face 11c is turned off. The light distribution pattern D shown in FIG. 6B includes a first light distribution pattern D1 and a second light distribution pattern D2. The first light distribution pattern D1 is a light distribution pattern formed by synthesizing the light distribution pattern Da and the light distribution pattern Db. The second light distribution pattern D2 is a light distribution pattern formed by synthesizing the light distribution pattern Dd and the light distribution pattern De. That is, in FIG. 6B, the light distribution pattern De shown in FIG. 6A is not projected onto the irradiated plane 90.

<Controller>

Figure 7:
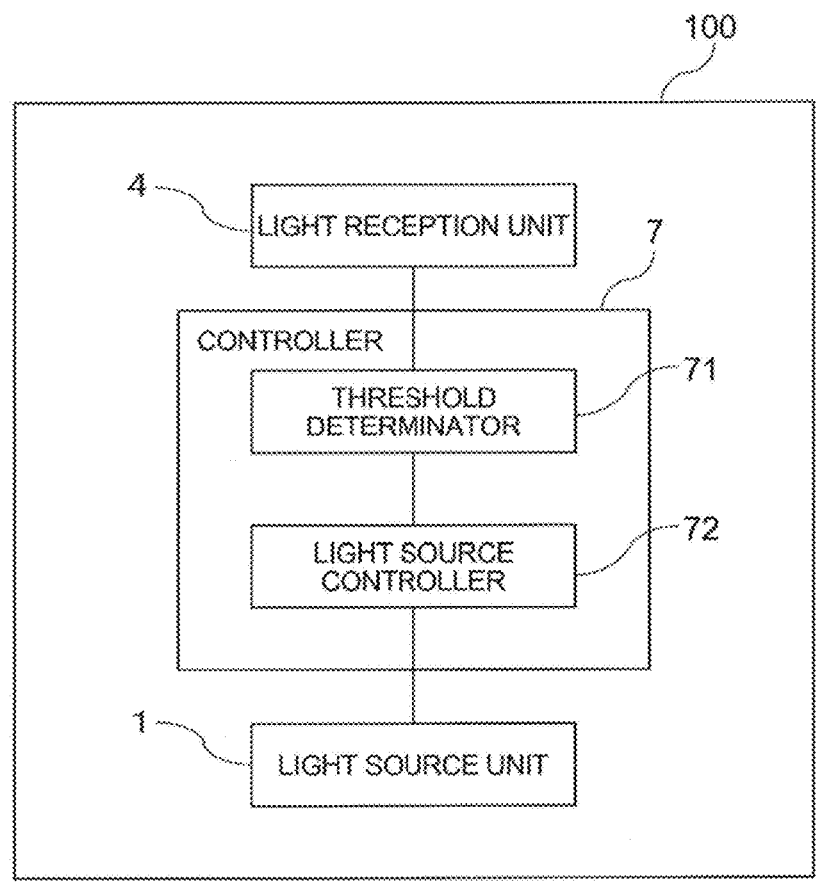
FIG. 7 is a functional block diagram schematically illustrating a configuration of the headlight device according to the first embodiment.

Then, the controller 7 will now be described in detail. FIG. 7 is a functional block diagram illustrating a configuration of the headlight device 100. As illustrated in FIG. 7, the headlight device 100 may include the controller 7 connected to the light source unit 1 and the light-reception unit 4. The controller 7 causes the light source unit 1 to adjust the light distribution pattern of light L1 based on the detection signal corresponding to light L3 detected by the light-reception unit 4. The detection signal output from the light-reception unit 4 herein is a signal corresponding to the amount of received light of light L3 detected by the light-reception unit 4. The controller 7 causes the light source unit 1 to adjust the light distribution pattern by controlling light emission of the plurality of light emitting faces 11 based on signals corresponding to the amounts of received light of light L3 detected at the plurality of light receiving faces 41.

The light source unit 1 includes a driving circuit (not shown) as a light source driver for driving the plurality of light emitting faces 11 illustrated in FIG. 3. For example, each of the plurality of light emitting faces 11 illustrated in FIG. 3 is turned on and off so that the light source unit 1 thereby emits light 10 as first light.

In this example, a unit in which the plurality of light emitting faces are capable of controlling the amount of light emission (including turning on and turning off) independently of each other will also be referred to as a "controlled unit." In the following description, the light emitting faces 11 and the light-emitting devices 10 corresponding to the light emitting faces 11 will be described as an example of such a "controlled unit." However, the controlled unit and the light emitting faces 11 (and further light-emitting devices 10) do not need to coincide with each other. For example, a plurality of controlled units may use a common optical face. Even if the boundary of such light emitting faces is unclear, in a case where a plurality of units capable of controlling the amount of light emission independently of each other are provided, it is regarded to include the plurality of light emitting faces 11. In such a case, the expression of "a plurality of light emitting faces 11" may be rendered as "a plurality of controlled units that emit light by one or more light emitting faces included in the light source unit 1."

Similarly, in this example, a unit in which the amount of received light can be detected independently of each other (including turning on and turning off) will also be referred to as a "controlled unit." In the following description, as an example of such a "detection unit," the light receiving faces 41 and the light-receiving devices 40 corresponding to the light receiving faces 41 will be described, as illustrated in FIG. 4 described later. However, the detection units do not need to coincide with the light receiving faces 41 (and further the light-receiving devices 40). For example, a plurality of detection unit may use a common optical face. Even if the boundary of such light receiving faces is unclear, in a case where a plurality of units in which the amount of received light can be detected independently of each other are provided, it is regarded to include the plurality of light receiving faces 41. In this case, the expression of the "plurality of light receiving faces 41" may be rendered as the "plurality of detection units in which light is received by one or more light receiving faces included in the light-reception unit 4."

In the first embodiment, the controller 7 causes the light source unit 1 to adjust a light distribution pattern by performing control of changing the amounts of light emission of the plurality of light emitting faces 11. The control of changing the amounts of light emission of the plurality of light emitting faces 11 here includes not only control of changing the amount of light emission of each of the plurality of light emitting faces 11 continuously or stepwise but also control of turning on or turning off each of the plurality of light emitting faces 11. In the following description, the control by the controller 7 to illuminate and extinguish each of the plurality of light emitting faces 11 will be described as an example.

As illustrated in FIGS. 1 and 2, the controller 7 includes a threshold determiner 71 and a light source controller 72. A detection signal output from the light-reception unit 4 is input to the threshold determiner 71. The detection signal output from the light-reception unit 4 includes a plurality of signals output from the plurality of receiving faces 41 (illustrated in FIG. 4) in response to light L3.

The threshold determiner 71 determines whether or not intensity of light L3 detected by the light-reception unit 4 is greater than or equal to a predetermined threshold based on the plurality of signals output from the plurality of light receiving faces 41. The threshold is set based on the configuration of the optical system of the headlight device 100 and specifications of the light-reception unit 4, for example. The threshold is set based on the amount of light irradiated from another vehicle at a predetermined distance (e.g., 100 m) from the headlight device 100 in the +Z-axis direction. In the first embodiment, the threshold determiner 71 determines whether or not intensity of light L3 detected by the light-reception unit 4 is greater than or equal to the threshold during a turn-off time in which the light source unit 1 is turned off. The threshold determiner 71 determines whether or not intensity of light L3 detected by each of the plurality of light receiving faces 41 is greater than or equal to the threshold.

If the threshold determiner 71 determines that intensity of light L3 detected by at least one of the plurality of light receiving faces 41 is greater than or equal to the threshold, the threshold determiner 71 outputs a signal indicating the determination result to the light source controller 72.

Based on the signal output from the threshold determiner 71, the light source controller 72 performs control of turning on and turning off each of the plurality of light emitting faces 11 illustrated in FIG. 3. Specifically, the light source controller 72 performs control of turning off the light emitting face 11 corresponding to the light receiving face 41 on which light L3 having intensity greater than or equal to the predetermined threshold is incident and turning on the other light emitting faces 11 in the plurality of light emitting faces 11.

The light source controller 72 controls the light source unit 1 so that the light source unit 1 periodically repeats an operation of turning on in a predetermined turn-on time and turning off in a turn-off time shorter than the turn-on time.

The controller 7 need not include the threshold determiner 71. For example, the controller 7 may perform control of continuously reducing the amount of light emission of the light source unit 1 or control of turning off the light source unit 1, based on the amount of received light of light L3 detected by the light-reception unit 4.

The controller 7 is, for example, a control circuit composed of a semiconductor integrated circuit. The controller 7 may be constituted by a processor for executing a program stored in a memory.

Figure 8:
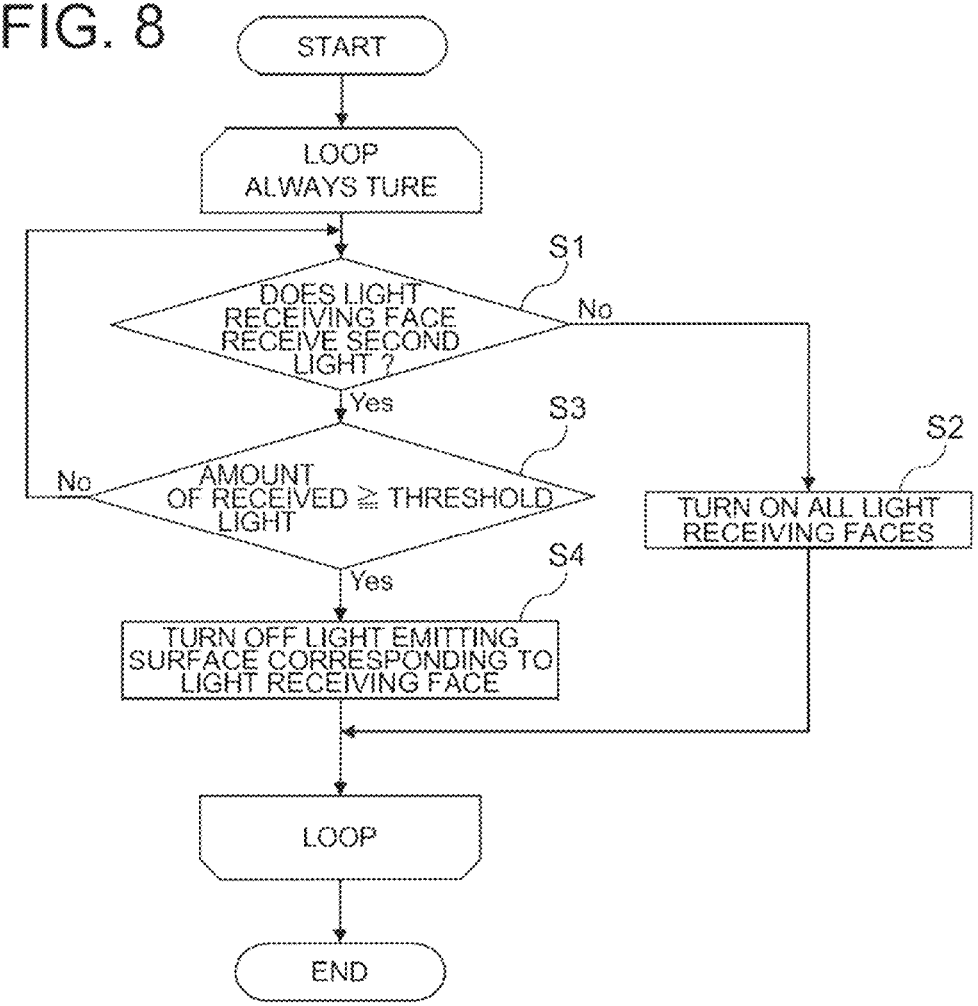
FIG. 8 is a flowchart depicting control contents of a controller illustrated in FIG. 1.

FIG. 8 is a flowchart depicting control contents of the controller 7. A method for controlling light emission of the plurality of light emitting faces 11 (illustrated in FIG. 3) by the controller 7 will now be described with reference to the flowchart of FIG. 8. In the flowchart of FIG. 8, a loop process in which steps S1 through S4 are repeated is performed.

First, it is determined whether each of the plurality of light receiving faces 41 has received light or not (step S1). In step S1, if it is determined that each of the plurality of light receiving faces 41 does not receive light L3, that is, neither a preceding vehicle nor an oncoming vehicle or the like, is present forward, the controller 7 performs control of illuminating all the plurality of light emitting faces 11 (step S2). At this time, the light distribution pattern D illustrated in FIG. 6A is projected onto the irradiated plane 90.

In step S1, if it is determined that at least one of the plurality of light receiving faces 41 has received light L3, that is, a preceding vehicle or an oncoming vehicle is present forward, it is determined whether or not the amount of receive light of light L3 detected by this light receiving face 41 is greater than or equal to the threshold (step S3). In step S3, if it is determined that the amount of received light is less than the threshold, the process returns to step S1.

In step S3, if it is determined that the amount of received light is greater than or equal to the threshold, the controller 7 performs control of turning off the light emitting face 11 corresponding to the light receiving face 41 on which light L3 having an amount of received light greater than or equal to the threshold is detected on the plurality of light emitting faces 11 (step S4). For example, if it is determined that the amount of received light of light L3 detected on the light receiving face 41c in the plurality of light receiving faces 41a through 41e illustrated in FIG. 4 is greater than or equal to the threshold, the light emitting face 11c corresponding to the light receiving face 41c in the plurality of light emitting faces 11a through 11e illustrated in FIG. 3 is turned off and the other light emitting faces 11a, 11b, 11d, and 11e continue turning on. At this time, the light distribution pattern D illustrated in FIG. 6B is projected onto the irradiated plane 90. In the manner described above, the light distribution pattern D is controlled based on the result of detection by the light-reception unit 4.

Next, another control method by the controller 7 will be described. In the control method shown in FIG. 8, the light distribution pattern is changed every time when an amount of received light greater than or equal to the threshold is detected on a certain light receiving face 41. Thus, when light having the amount of received light greater than or equal to the threshold is repeatedly detected on the certain light receiving face 41, the controller 7 repeats switching of the light distribution pattern. Consequently, a driver on a vehicle irradiated with light L1 feels uneasiness. Thus, the controller 7 may perform control for adjusting a light distribution pattern when a predetermined condition is satisfied.

Specifically, the threshold determiner 71 may perform determination of whether or not the number of times intensity of light L3 incident on the light-reception unit 4 becomes the predetermined threshold or more reaches a predetermined reference number of times or more within a predetermined time. The "predetermined time" herein is preferably set at a time of one second or less. This is because if the predetermined time is excessively long, the vehicle including the headlight device 100 excessively approaches the range of another vehicle (e.g., an oncoming car) and cannot appropriately change the light distribution pattern.

<Relationship Between Light Receiving Face and Irradiated Region of Illuminating Light>

Figure 9:
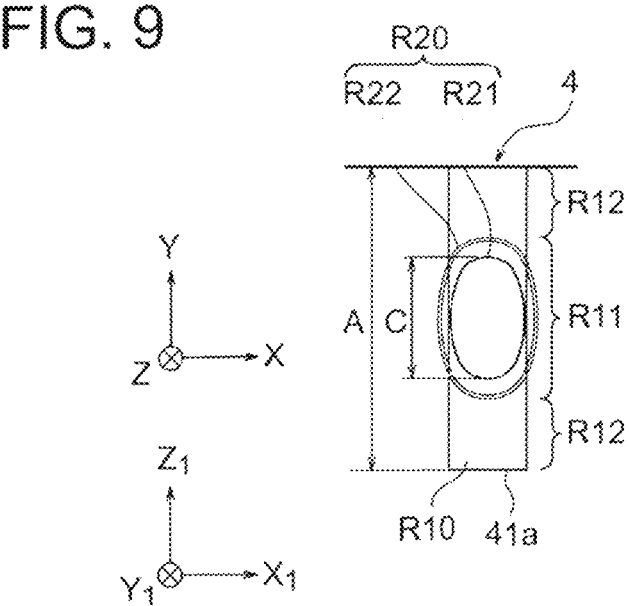
FIG. 9 is a diagram illustrating one of a plurality of light receiving faces shown in FIG. 4, and an irradiated region of first light emitted from one of the plurality of light emitting faces shown in FIG. 3.

Next, a relationship between the light receiving faces 41 and the irradiated region of light L1 serving as illuminating light will be described. FIG. 9 is a diagram illustrating one light receiving face 41a of the plurality of light receiving faces 41 illustrated in FIG. 4 and an irradiated region R20 irradiated with light emitted from one light emitting face 11a of the plurality of light emitting faces 11 illustrated in FIG. 3 in the headlight device 100 according to the first embodiment. In FIG. 9 and FIGS. 12A, 12B, 13B, and 14B described later, the irradiated region R20 is shown to overlap with the light receiving face in order to describe the correspondence relationship between the light receiving face and the irradiated region of light L1.

In FIG. 9 and FIGS. 12A, 12B, 13B, and 14B, an $X_1Y_1Z_1$ orthogonal coordinate system is used as a new coordinate system in order to facilitate understanding of description of the light-reception unit. The $X_1Y_1Z_1$ orthogonal coordinate system is a coordinate system in which the XYZ orthogonal coordinate system is seen from the −Y-axis side. The $X_1$ axis is the same as the X axis. The $Z_1$ axis is parallel to the Y axis. In the following description, a light receiving region of one of the plurality of light receiving faces 41 illustrated in FIG. 4 is denoted by R10. An irradiated region of light L1 emitted from one of the plurality of light emitting faces 11 illustrated in FIG. 3 is denoted by R20.

As illustrated in FIG. 9, the irradiated region R20 includes a first irradiated region R21 as a center region of the irradiated region R20 and a second irradiated region R22 as a ring-shaped region located outside the first irradiated region R21. The first irradiated region R21 is an irradiated region irradiated with light having an amount of light (i.e., light intensity) of a predetermined threshold T2 or more. The second irradiated region R22 is an irradiated region irradiated with light having an amount of light (i.e., light intensity) less than the threshold T2. In this example, each of the first irradiated region R21 and the second irradiated region R22 has an oval shape elongated in the Y-axis direction.

A length A of a side of the light receiving face 41a in a $Z_1$-axis direction is equal to or larger than a longer diameter C of the oval first irradiated region R21. The light receiving region R10 of the light receiving face 41a includes a first light receiving region R11 and a second light receiving region R12. The first light receiving region R11 is a region corresponding to the irradiated region R20. Specifically, the first light receiving region R11 is a region in which light L3 (shown in FIG. 1) emitted from a region overlapping with the irradiated region R20 is detected.

The second light receiving region R12 is disposed at a location adjacent to the first light receiving region R11 in the $Z_1$-axis direction. As illustrated in FIG. 9, the light receiving region R10 may include two second light receiving regions R12. The light receiving region R10 may include one second light receiving region R12. Since the light receiving region R10 includes the second light receiving region R12, the size of the light receiving region R10 is larger than the size of the irradiated region R20 in the Z-axis direction. That is, the size of the light receiving face 41a is larger than the size of the irradiated region R20 in the $Z_1$-axis direction. Although the first embodiment shows an example that the size of each of the plurality of light receiving faces 41 is larger than the size of the irradiated region R20, the size of at least one of the plurality of light receiving faces 41 may be larger than the size of the irradiated region R20.

The second light receiving region R12 is a light receiving region not corresponding to the irradiated region R20. That is, the light receiving region R10 of the light receiving face 41a may include a region except for a region corresponding to the irradiated region R20 irradiated with light L1 emitted from the light emitting face 11a constituting the controlled unit corresponding to this light receiving face 41a. Light emitted from outside of the irradiated region R20 enters the second light receiving region R12. Specifically, light emitted from outside of the irradiated region R20 in the top-bottom direction enters the second light receiving region R12. That is, light emitted from a region wider than the irradiated region R20 irradiated with light L1 enters the light receiving face 41a as incident light. It is predicted that light detected in the second light receiving region R12 enters the second light receiving region R12 and then enters the first light receiving region R11.

The light-reception unit 4 outputs a signal corresponding to light detected in the first light receiving region R11 and a signal corresponding to light detected in the second light receiving region R12, to the controller 7 (illustrated in FIGS. 1 and 2). The controller 7 causes the light source unit 1 (illustrated in FIGS. 1 and 2) to adjust a light distribution pattern based on a signal corresponding to light detected in the first light receiving region R11. The controller 7 can cause the light source unit 1 to adjust the light distribution pattern before light L3 having an amount of light greater than or equal to the threshold T1 enters the first light receiving region R11, based on a prediction signal corresponding to light detected in the second light receiving region R12. Although the two second light receiving regions R12 are shown in FIG. 9, the number of the second light receiving regions R12 may be one or three or more.

<Light Distribution Changing Lens>

Figure 10A:
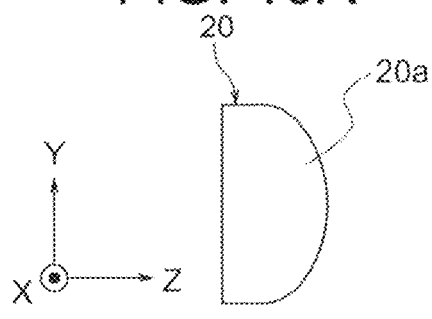
FIG. 10A is a side view illustrating an example of a light distribution changing lens.
Figure 10B:
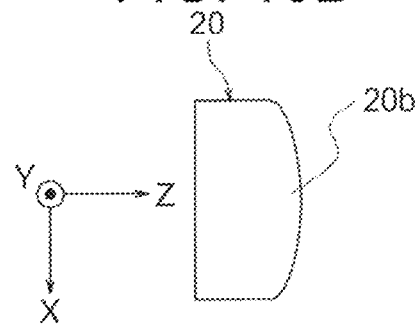
FIG. 10B is a plan view illustrating an example of the light distribution changing lens.

Next, the light distribution changing lens 20 will be described in detail. FIG. 10A is a side view illustrating an example of the light distribution changing lens 20. FIG. 10B is a plan view illustrating an example of the light distribution changing lens 20. As illustrated in FIGS. 10A and 10B, the light distribution changing lens 20 is, for example, a toroidal lens. The shape of a surface 20a illustrated in FIG. 10A in the Y-axis direction is a convex curve having a curvature in the Y-axis direction. The shape of a surface 20b illustrated in FIG. 10B in the X-axis direction is a convex curve having a curvature in the X-axis direction. Accordingly, the light distribution changing lens 20 has positive power in the X-axis direction and positive power in the Y-axis direction. In the example of FIGS. 10A and 10B, the curvature of the surface 20a in the Y-axis direction is larger than the curvature of the surface 20b in the X-axis direction. That is, positive power in the Y-axis direction is larger than positive power in the X-axis direction. The power herein refers to refractive power.

As described above, light L0 emitted from the light source unit 1 enters the light distribution changing lens 20. In a case where all the plurality of light emitting faces 11 illustrated in FIG. 3 are turned on, when light L0 enters the light distribution changing lens 20, the plurality of light distribution patterns Da through De (illustrated in FIG. 5) are arranged in the X-axis direction on the irradiated plane 90 by positive power of the light distribution changing lens 20 in the X-axis direction.

The shape of each of the plurality of light distribution patterns Da through De becomes a rectangle obtained by enlarging the square shape of the light emitting face 11 in the Y-axis direction by positive power of the light distribution changing lens 20 in the Y-axis direction. That is, the light distribution pattern of light L0 from each of the light emitting faces 11 before the light L0 enters the light distribution changing lens 20 is a square, but the light distribution pattern of light that has passed through the light distribution changing lens 20 is a rectangle elongated in the Y-axis direction. For example, the plurality of light distribution patterns Da through De projected onto the irradiated plane 90 have a higher degree of blurring in end portions in the Y-axis direction than in end portions in the X-axis direction. That is, boundaries of end portions of the light distribution patterns Da through De in the Y-axis direction are unclear.

Figure 11A:
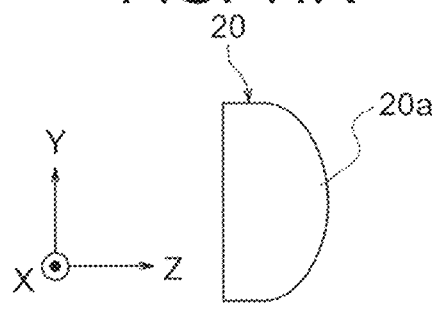
FIG. 11A is a side view illustrating another example of the light distribution changing lens.
Figure 11B:
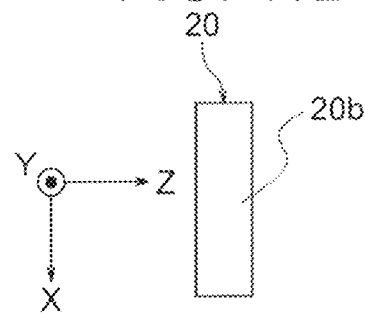
FIG. 11B is a plan view illustrating another example of the light distribution changing lens.

In this example, the toroidal lens includes a cylindrical lens. FIG. 11A is a side view illustrating a cylindrical lens as another example of the toroidal lens. FIG. 11B is a plan view illustrating the cylindrical lens as another example of the toroidal lens. The shape of the surface 20a in the Y-axis direction illustrated in FIG. 11A is a convex curve having a curvature in the Y-axis direction. The shape of the surface 20b illustrated in FIG. 11B in the X-axis direction is a straight line having no curvature in the X-axis direction. Accordingly, the light distribution changing lens 20 illustrated in FIGS. 11A and 11B has positive power in the Y-axis direction and no positive power in the X-axis direction. The light distribution changing lens 20 may be, for example, a free-form surface lens as long as a light distribution pattern in which an aspect ratio of the light emitting faces 11 of the light source unit 1 is enlarged in the Y-axis direction is formed. For example, the light distribution changing lens 20 may be a free-form surface lens having different curvatures between the X-axis direction and the Y-axis direction. The example described above is an example for changing a light distribution pattern of light emitted by the light source unit 1 having the plurality of light emitting faces 11 arranged in the Z-axis direction to a light distribution shape required for a vehicle light unit. In a case where one light emitting face 11 is provided or the plurality of light emitting faces 11 are arranged in the Y-axis direction, the present invention is not limited to this example. The present invention is not limited to this example either, in a case where the shape is enlarged by using the projector lens 30, which will be described later.

The lens for changing a light distribution pattern of light L0 is not limited to the light distribution changing lens 20, and may be the projector lens 30 illustrated in FIGS. 1 and 2. That is, the projector lens 30 may be a toroidal lens as illustrated in FIGS. 10A and 10B and FIGS. 11A and 11B or a free-form surface lens. In addition, both the light distribution changing lens 20 and the projector lens 30 may be toroidal lenses as illustrated in FIGS. 10A and 10B and FIGS. 11A and 11B, or free-form surface lenses. In a case where the projector lens 30 has different curvatures between the X-axis direction and the Y-axis direction, the condenser lens 60 may be configured to have different curvatures between the X-axis direction and the Y-axis direction so that a change (also referred to as "difference") in curvature between the X axis and the Y axis of the projector lens 30 is absorbed (also referred to as "invalidated").

In the example described in the first embodiment, the projector lens 30 projects the light distribution pattern D (illustrated in FIGS. 6A and 6B) changed by the light distribution changing lens 20 onto the irradiated plane 90 illustrated in FIG. 1. In the following description, a synthesis focal point of the light distribution changing lens 20 and the projector lens 30 in the X-axis direction is denoted by F1. One of the focal points of the condenser lens 60 at the side toward the light-reception unit 4 is denoted by F2. The synthesis focal point F1 is a focal point at the −Z-axis side of the light distribution changing lens 20 and the projector lens 30. As illustrated in FIG. 2, the location of the synthesis focal point F1 in the Z-axis direction overlaps with the location of the light source unit 1 in the Z-axis direction. As described above, the light distribution changing lens 20 and the projector lens 30 are disposed so that the location of the synthesis focal point. F1 in the X-axis direction and the location of the light emitting faces 11 of the light source unit 1 overlap with each other in the Z-axis direction. Accordingly, an image on the light emitting faces 11 is enlarged in the X-axis direction and projected onto an imaginary projection plane.

The location of the synthesis focal point F1 may be shifted in the ±Z-axis direction from the location of the light emitting faces 11 of the light source unit 1. For example, the location of the synthesis focal point F1 may be shifted within a range of 12 mm or less from the location of the light emitting faces 11 of the light source unit 1. The imaginary projection plane 90 here may be a plane at a location at which the light-reception unit 4 is focused. In this case, a distance from the imaginary projection plane 90 to the focal point F2 of the condenser lens 60 at the side to the light-reception unit 4 on the optical axis of the image pickup optical system 120 may be substantially equal to (within an error of 1 mm or less) a distance from the imaginary projection plane 90 to the synthesis focal point F1 on the optical axis of the projection optical system 110. Accordingly, an appropriate degree of blurring can be caused at boundaries of the plurality of light distribution patterns Da through De of light L0 emitted in the X-axis direction, especially from the plurality of light emitting faces 11. That is, in the light distribution pattern D formed by the plurality of light distribution patterns Da through De, boundaries of the plurality of light distribution patterns Da through De can be made unclear, and thus, it is possible to reduce luminance variations in a light distribution pattern actually projected after overlapping of the light distribution patterns Da through De. Thus, by appropriately setting the locations of the light distribution changing lens 20 and the projector lens 30 in the Z-axis direction, luminance variations can be suppressed on the light distribution patterns D projected onto the irradiated plane 90.

As described above, since the irradiated plane 90 and the light source unit 1 have an imaging relationship in the X-axis direction, the light distribution pattern D is projected onto the irradiated plane 90, as illustrated in FIGS. 6A and 6B. Specifically, since the light source unit 1 has an imaging relationship with a point on the irradiated plane 90, an edge of the light distribution pattern D at least in the longitudinal direction (i.e., Y-axis direction) can be clearly projected onto the irradiated plane 90. In the Y-axis direction, the irradiated plane 90 and the light source unit 1 do not need to have an imaging relationship.

<Advantages of First Embodiment>

The headlight device 100 according to the first embodiment. has the following advantages.

In the headlight device 100, the projection optical system 110 and the image pickup optical system 120 share a part of the optical axes thereof and use the common projector lens 30 so that the irradiation range of light 11 emitted from the headlight device 100 and the incident range of incident light L2 entering the headlight device 100 can be easily made coincide with each other. Thus, it is possible to suppress occurrence of a shift between a visual field for detecting a vehicle located in the light irradiation direction and the irradiation range of the light distribution pattern.

Since the projection optical system 110 and the image pickup optical system 120 use the common projector lens 30, aesthetic design of the headlight device 100 can be enhanced.

In the headlight device 100, the projection optical system 110 includes the light distribution changing lens 20, and the image pickup optical system 120 includes the condenser lens 60. Thus, by causing the shape or curvature of the light distribution changing lens 20 to be different from the shape or curvature of the condenser lens 60, the shapes or the degrees of blurring of the light distribution pattern of light L1 and an imaging region forward of the vehicle can be controlled.

By causing the curvature of the light distribution changing lens 20 to be different between the X-axis direction (i.e., horizontal direction) and the Y-axis direction (i.e., vertical direction), the degree of blurring of the light distribution pattern D projected onto the irradiated plane 90 can be controlled in the X-axis direction and the Y-axis direction. In the first embodiment, since the degree of blurring of the light distribution pattern D is larger in an end portion in the Y-axis direction than in an end portion in the X-axis direction, an edge of the light distribution pattern D in the longitudinal direction (i.e., Y-axis direction) can be clearly projected onto the irradiated plane 90, and an edge in the X-axis direction is soft. That is, the light distribution pattern D can be accurately controlled (e.g., an irradiated region to be turned off can be accurately turned off) in the X-axis direction, and light L1 including blurring can be emitted in a wide range in the Y-axis direction.

Since light L1 including blurring is emitted in a wide range in the Y-axis direction, a driver of the vehicle including the headlight device 100 notices the presence of another vehicle in an early stage, and then, recognizes that another vehicle gradually clearly appears.

In the headlight device 100, the plurality of detection units (plurality of light receiving faces 41) and the plurality of controlled units (the plurality of Light emitting faces 11 in the first embodiment) have one-to-one correspondence. The controller 7 controls light emission of the plurality of light emitting faces 11 based on signals output from the light receiving faces 41 respectively corresponding to the plurality of light emitting faces 11 of the plurality of light receiving faces 41 to thereby causes the light source unit 1 to adjust light distribution patterns. Accordingly, a target region continues to be appropriately irradiated with light L1, and thus, a visibility of the driver of the vehicle including the headlight device 100 can be well ensured.

In the headlight device 100, in the light source unit 1, in a case where the light distribution pattern of light L1 is adjusted by turning on and turning off of each of the plurality of light emitting faces 11, the light distribution pattern can be adjusted with a simple configuration.

In a case where the threshold determiner 71 determines whether or not the amount of received light of light L3 detected on the plurality of light receiving faces 41 is greater than or equal to the threshold T1, when all the plurality of light emitting faces 11 are turned off, a detection signal output from the light-reception unit 4 to the threshold determiner 71 does not include a detection signal corresponding to light L1, and thus, determination accuracy of the threshold determiner 71 is enhanced. Accordingly, the controller 7 causes the light source unit 1 to accurately adjust the light distribution pattern of Light L1. In addition, since the controller 7 sets the turn-on time of the light source unit 1 longer than the turn-off time, a sufficiently large irradiation amount of light L1 can be obtained.

In the headlight device 100, in a case where the light receiving region R10 of the light receiving faces 41 is made larger than the irradiated region R20 of light L1 in the $Z_1$-axis direction, the light-reception unit 4 can output a prediction signal indicating that another vehicle is approaching the irradiated region of light L1, to the controller 7. The use of the prediction signal enables the controller 7 to appropriately switch the light distribution pattern in an early stage.

In the headlight device 100, since the image pickup optical system 120 of the headlight device 100 includes the light-reception unit 4 including the light-receiving devices 40, the size of the headlight device 100 can be reduced, as compared to a case where the image pickup optical system includes a camera.

Variation of First Embodiment

The configuration of the light-reception unit 4 described in the first embodiment may be another configuration. For example, the light receiving faces 41 of the light-reception unit 4 of the first embodiment may have other shapes.

Figure 12A:
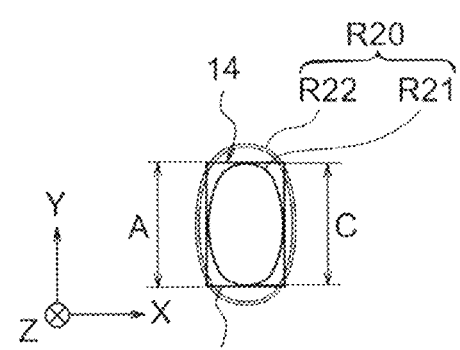
FIG. 12A is a diagram illustrating a part of a light-reception unit and an irradiated region of first light emitted from one of the plurality of light emitting faces shown in FIG. 3 in a headlight device according to a variation of the first embodiment.

FIG. 12A is a diagram illustrating a part of the light-reception unit 14 and the irradiated region R20 irradiated with light emitted from one light emitting face 11a of the plurality of light emitting faces 11 shown in FIG. 3 in a headlight device according to a variation of the first embodiment of the present invention. In FIG. 12A, the same reference characters as those in FIG. 9 designate the same or corresponding components as those illustrated in FIG. 9, and description thereof will be omitted. As illustrated in FIG. 12A, the length A of the side of a light receiving face 141a of the light-reception unit 14 in the $Z_1$-axis direction is equal to a longer diameter C of the oval first irradiated region R21.

In the example of the first embodiment, the number of the plurality of light receiving faces 41 is equal to the number of the plurality of light emitting faces 11. Alternatively, the number M of the plurality of light receiving faces 41 may be larger than the number N of the plurality of light emitting faces 11. For example, the number M of the plurality of light receiving faces 41 may be Q times (where Q is an integer of two or more) as large as the number N of the plurality of light emitting faces 11.

Figure 12B:
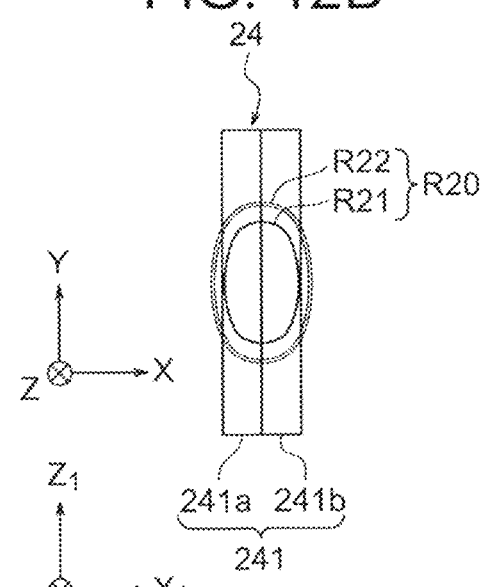
FIG. 12B is a diagram illustrating a part of a light-reception unit and an irradiated region of first light emitted from one of the plurality of light emitting faces shown in FIG. 3 in a headlight device according to another variation of the first embodiment.

FIG. 12B is a diagram illustrating a part of the light-reception unit 24 and the irradiated region R20 irradiated with light emitted from one light emitting face 11a of the plurality of light emitting faces 11 shown in FIG. 3 in a headlight device according to another variation of the first embodiment. In FIG. 12B, the same reference characters as those in FIG. 9 designate the same or corresponding components as those illustrated in FIG. 9, and description thereof will be omitted.

In the example of FIG. 12B, the number M of a plurality of light receiving faces 241 is twice as large as the number N of the plurality of light emitting faces 11 illustrated in FIG. 3. As illustrated in FIG. 12B, two adjacent light receiving faces 241a and 241b in the plurality of light receiving faces 241 correspond to one irradiated region R20. That is, in FIG. 12B, the two light receiving faces 241a and 241b correspond to one light emitting face 11.

In the headlight devices according to the variations of the first embodiment described above, the configurations of the light-reception units 14 and 24 can be simplified.

Regarding the other aspects, the variations of the first embodiment are the same as examples illustrated in FIGS. 1 through 11.

Second Embodiment

In the example of the first embodiment, all the plurality of light receiving faces 41 included in the light-reception unit 4 respectively correspond to the plurality of light emitting faces 11. Alternatively, all the light receiving faces included in the light-reception unit do not need to correspond to the plurality of light emitting face respectively.

Figure 13A:
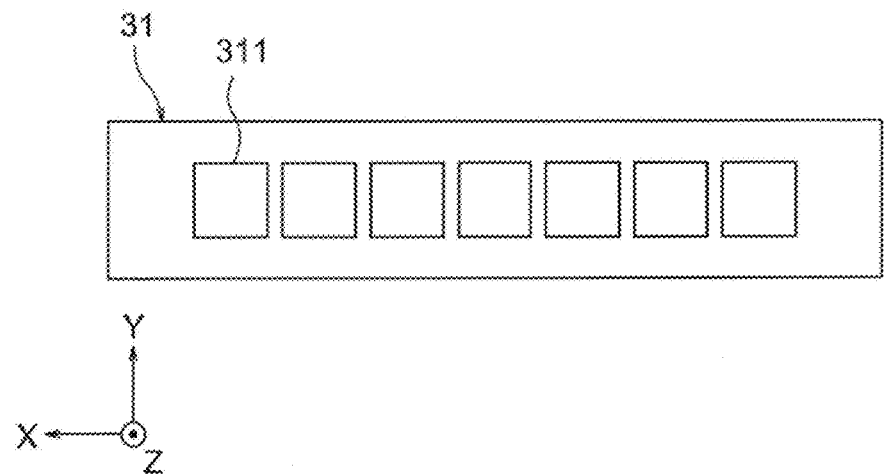
FIG. 13A is a diagram illustrating a configuration of a light source unit of a headlight device according to a second embodiment of the present invention.
Figure 13B:
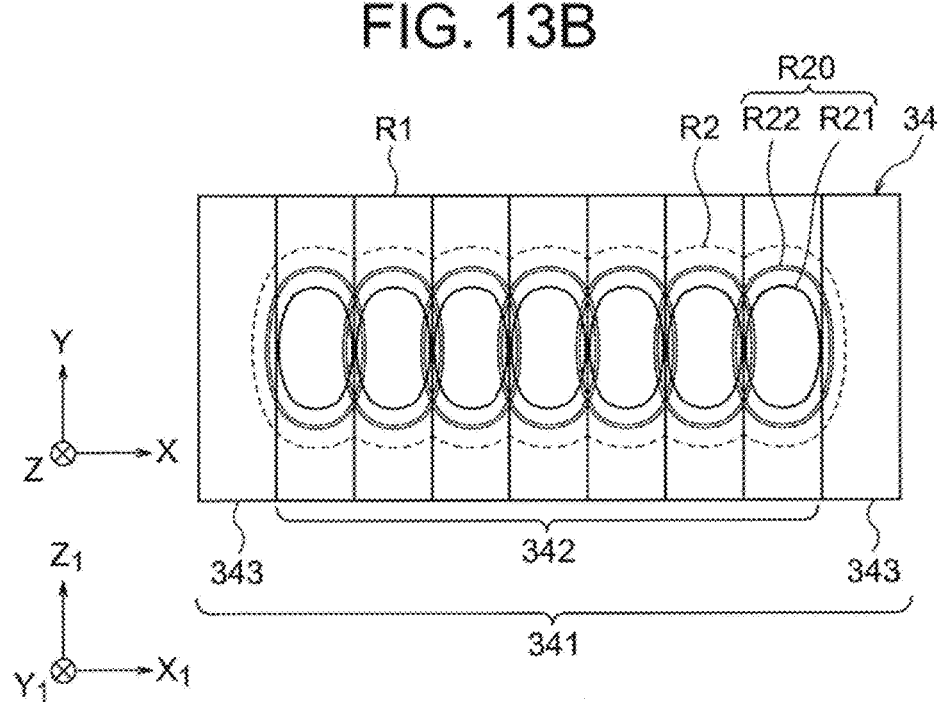
FIG. 13B is a diagram illustrating a light-reception unit and a plurality of irradiated regions of first light emitted from a plurality of light emitting faces shown in FIG. 13A in the headlight device according to the second embodiment.

FIG. 13A is a diagram illustrating a configuration of a light source 21 of a headlight device according to a second embodiment of the present invention. FIG. 13B is a diagram illustrating a light-reception unit 34 and a plurality of irradiated regions R20 of light emitted from a plurality of light emitting faces 211 shown in FIG. 13A in the headlight device according to the second embodiment. In FIG. 13B, the same reference characters as those in FIG. 9 designate the same or corresponding components as those illustrated in FIG. 9, and description thereof will be omitted. In FIG. 13B, a light receiving region formed by a plurality of first light receiving faces 342 and second light receiving faces 343 is denoted by R1, and an irradiated region of light L1 emitted from the plurality of light emitting faces 211 through a projector lens 30 (illustrated in FIG. 1) is denoted by R2.

As illustrated in FIG. 13A, the light source 21 includes the plurality of (seven in FIG. 13A) light emitting faces 211 arranged in the X-axis direction. Each of the plurality of light emitting faces 211 emits Light.

As illustrated in FIG. 13B, the number of a plurality of light receiving faces 341 is nine, which is larger than the number of a plurality of light emitting faces 311 illustrated in FIG. 13A. The plurality of light receiving faces 341 includes the plurality of first light receiving faces 342 and the plurality of second light receiving faces 343. The plurality of first light receiving faces 342 are light receiving faces respectively corresponding to the plurality of irradiated regions R20 irradiated with light L1 (illustrated in FIG. 1). That is, the plurality of first light receiving faces 342 respectively correspond to the plurality of light emitting faces 211 illustrated in FIG. 13A.

The second light receiving faces 343 are located at a location adjacent to the outside (right side in FIG. 13B) of the first light receiving face 342 at the end of the plurality of first light receiving faces 342 at the $+X_1$-axis side, and at a location adjacent to the inside (left side in FIG. 13B) of the first light receiving face 342 at the $-X_1$-axis side. Since the light-reception unit 34 includes the second light receiving faces 343, the size of a light receiving region R1 is larger than the size of an irradiated region R2.

The plurality of second light receiving faces 343 are light receiving faces not corresponding to the plurality of irradiated regions R20 irradiated with light L1 (illustrated in FIG. 1). That is, the plurality of second light receiving faces 343 do not correspond to the plurality of light emitting faces 211 illustrated in FIG. 13A. Light emitted from outside of the irradiated region of light L1 enters the second light receiving faces 343. Specifically, light emitted from outside of the irradiated region R2 irradiated with light L1 in the left-right direction enters the second light receiving faces 343. That is, light emitted from a region wider than the irradiated region R2 irradiated with light L1 enters the second light receiving faces 343. It is predicted that light detected on the second light receiving faces 343 enters the second light receiving faces 343 and then enters the first light receiving faces 342 adjacent to the second light receiving faces 343. That is, signals corresponding to light detected on the second light receiving faces 343 are prediction signals for predicting light expected to enter the first light receiving faces 342.

The light-reception unit 34 outputs signals corresponding to light detected on the first light receiving faces 342 and signals corresponding to light detected on the second light receiving faces 343, to the controller 7 (illustrated in FIGS. 1 and 2). The controller 7 causes the light source 21 (illustrated in FIG. 13A) to adjust a light distribution pattern based on signals corresponding to light detected on the first light receiving faces 342. The controller 7 can cause the light source 21 to adjust the light distribution pattern before light having an amount of light greater than or equal to a threshold T1 enters the first light receiving faces 342, based on a prediction signal corresponding to light detected on the second light receiving faces 343. Although FIG. 13B shows two second light receiving faces 343, the number of the second light receiving faces 343 may be one, or three or more. That is, it is sufficient that the light-reception unit 34 includes P first light receiving faces 342 respectively corresponding to a plurality of controlled units (the plurality of light emitting faces 211 in the second embodiment) and at least one second light receiving face 343 not corresponding to the plurality of controlled units. In this embodiment, P is an integer of two or more.

In the headlight device according to the second embodiment described above, since the light-reception unit 34 includes the second light receiving faces 343, the light-reception unit 34 can output a prediction signal indicating that another vehicle is approaching the irradiated region R2 irradiated with light L1, to the controller 7. Accordingly, the controller 7 can cause the light source 21 to adjust the light distribution pattern before light having an amount of light greater than or equal to the threshold T1 enters the first light receiving faces 342, based on the prediction signal output from the light receiving faces 34. Thus, in the headlight device according to the second embodiment, the controller 7 can cause the light source unit 1 to appropriately adjust a light distribution pattern in an early stage.

Regarding the other aspects, the headlight device according to the second embodiment is the same as the headlight device 100 according to the first embodiment.

Third Embodiment

In the example described in the first embodiment, the plurality of light emitting faces 11 are linearly arranged in the light source unit 1. Alternatively, the plurality of light emitting faces may be arranged in a matrix in which J (where J is an integer of two or more) of light emitting faces are arranged in the Y-axis direction and N (where N is an integer of two or more) light emitting faces are arranged in the X-axis direction.

Figure 14A:
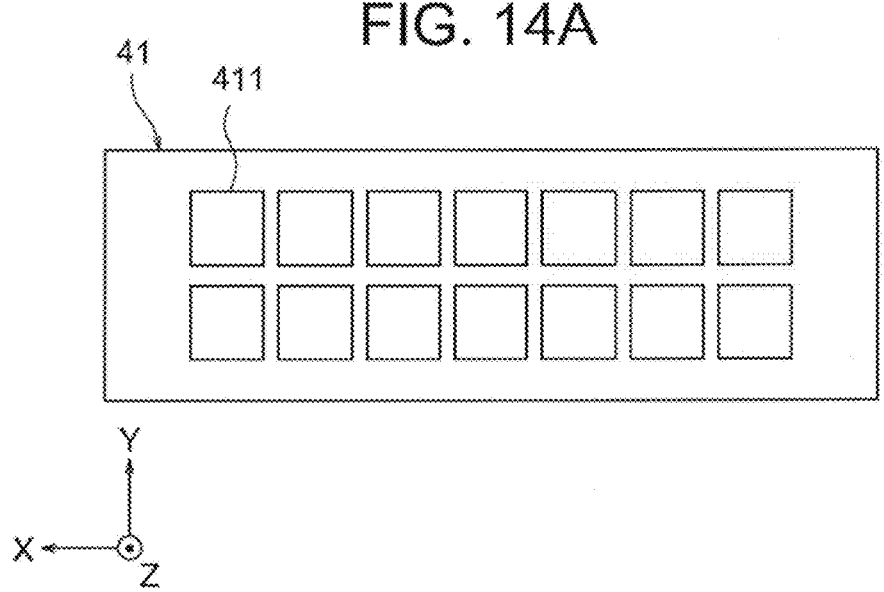
FIG. 14A is a diagram illustrating a configuration of a light source unit of a headlight device according to a third embodiment of the present invention.
Figure 14B:
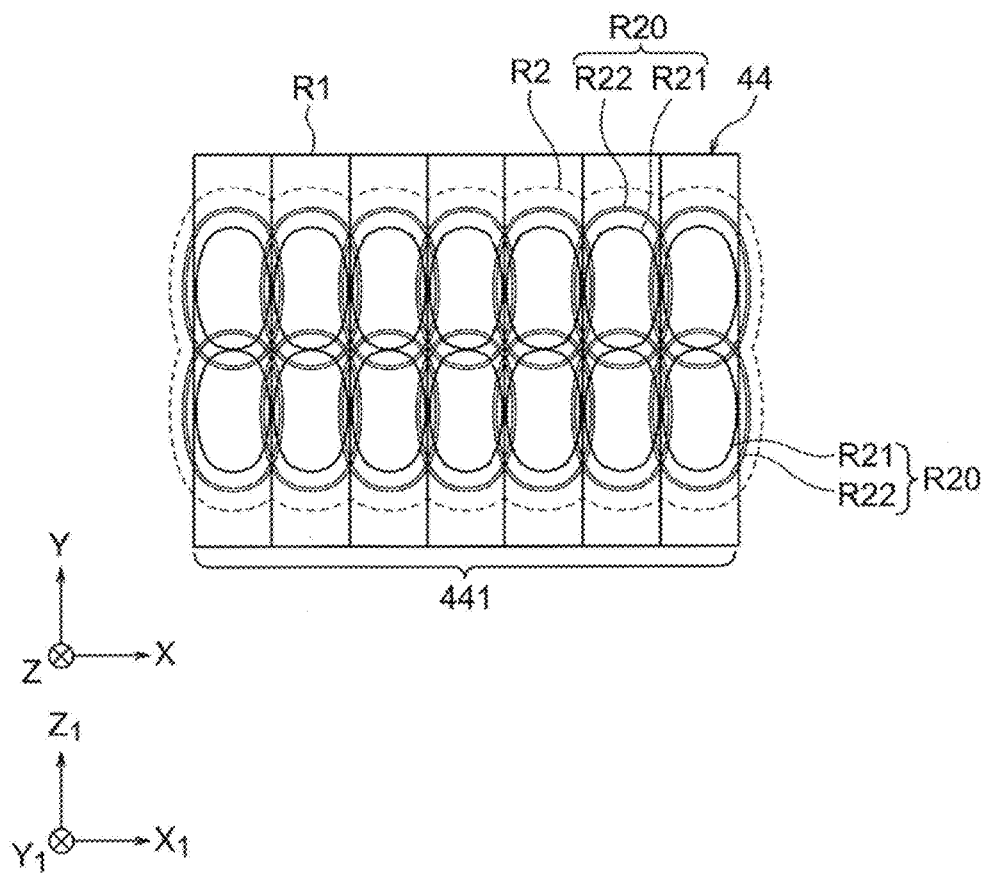
FIG. 14B is a diagram illustrating a light-reception unit and a plurality of irradiated regions of first light emitted from a plurality of light emitting faces shown in FIG. 14A in the headlight device according to the third embodiment.

FIG. 14A is a diagram illustrating a configuration of a light source 31 of a headlight device according to a third embodiment of the present invention. FIG. 14B is a diagram illustrating a light-reception unit 44 and a plurality of irradiated regions R20 irradiated with light emitted from a plurality of light emitting faces 311 shown in FIG. 14A in the headlight device according to the third embodiment. In FIG. 14B, the same reference characters as those in FIG. 9 designate the same or corresponding components as those illustrated in FIG. 9, and description thereof will be omitted.

As illustrated in FIG. 14A, the light source 31 includes the plurality of light emitting faces 311 arranged in a matrix in a plurality of rows and a plurality of columns (two rows and seven columns in FIG. 14A).

As illustrated in FIG. 14B, the light-reception unit 44 includes a plurality of light receiving faces 441. One of the plurality of light receiving faces 441 is a light receiving face corresponding to two irradiated regions R20 arranged in the Y-axis direction. That is, one light receiving face 441 corresponds to two of the plurality of light emitting faces 311 arranged in the Y-axis direction.

In the third embodiment, the plurality of light receiving faces 441 may have one-to-one correspondence with the plurality of light emitting faces 311. That is, the plurality of light receiving faces 441 may be arranged in a matrix of two rows and seven columns.

In the headlight device according to the third embodiment described above, since the plurality of light emitting faces 311 are arranged in a matrix of a plurality of rows and a plurality of columns, light L1 can be emitted in a more appropriate light distribution pattern.

In the headlight device according to the third embodiment, the number of the plurality of light receiving faces 441 is smaller than the number of the plurality of light emitting faces 311. Thus, the configuration of the light-reception unit 44 can be simplified.

Regarding the other aspects, the headlight device according to the third embodiment is the same as the headlight device according to the first embodiment.

Fourth Embodiment

In the example described in the first embodiment, the headlight device 100 including one headlight module 100a is described. Alternatively, the headlight device may include a plurality of headlight modules 100a.

FIG. 15 is a plan view schematically illustrating a configuration of a headlight device 400 according to a fourth embodiment of the present invention. In FIG. 15, the same reference characters as those in FIG. 1 designate the same or corresponding components as those illustrated in FIG. 1. As illustrated in FIG. 15, the headlight device 400 includes the plurality of headlight modules 100a, a casing 401, and a cover 402. In FIG. 1, one headlight module 100a is controlled by one controller 7. In FIG. 15, the plurality of headlight modules 100a may be controlled by a common controller.

The casing 401 is disposed inside the body of a vehicle including the headlight device 400. The casing 401 has a box shape. A plurality of (three in FIG. 15) headlight modules 100a are housed in the casing 401. The shape of the casing 401 is not limited to a box shape. For example, the casing 401 may be constituted by, for example, a frame, and the plurality of headlight modules 100a may be fixed to the frame.

In the casing 401, the plurality of headlight modules 100a are arranged in the X-axis direction. In the arrangement direction of the plurality of headlight modules 100a is not limited to the X-axis direction, and may be other directions. For example, the plurality of headlight modules 100a may be arranged in the Y-axis direction. The plurality of headlight modules 100a may be arranged in a direction tilted to the Y-axis direction, a direction tilted to the Z-axis direction, or a direction tilted to both the Y-axis direction and the Z-axis direction. Design and function of the headlight device 400 can be enhanced by appropriately arranging the plurality of headlight modules 100a.

The cover 402 is disposed at the +Z-axis side of the casing 401. The cover 402 is disposed on the surface of the vehicle body, and exposed to the outside of the vehicle body. The cover 402 is made of, for example, a transparent material.

In the headlight device 400 according to the fourth embodiment described above, each of the plurality of headlight modules 100a accurately emits light L1 to a target region (e.g., region except for a preceding vehicle and an oncoming vehicle or the like) Thus, the headlight device 400 can more accurately emit light L1 to the target region.

In the headlight device 400 according to the fourth embodiment, the plurality of headlight modules 100a are protected by the cover 402 against the weather, dust, and the like.

Regarding the other aspects, the fourth embodiment is the same as the first embodiment.

APPENDIX

The foregoing embodiments include the invention described in the following appendices.
<Appendix 1>
A headlight device includes:
  a light source unit to emit first light and adjusts a light distribution pattern of the first light;
  a light distribution changing lens that changes the light distribution pattern adjusted by the light source;
  a light-reception unit that detects incident second light;
  an optical member to emit the first light from the light distribution changing lens to a predetermined emission direction and emits incident light traveling in a direction opposite to the emission direction as the second light traveling toward the light-reception unit;
  a projector lens to emit the first light emitted from the optical member to the emission direction as illuminating light;
  a condenser lens that focuses the second light emitted from the optical member toward the light-reception unit; and
  a controller to cause the light source to adjust the light distribution pattern based on an intensity of the second light detected by the light-reception unit, the light source unit includes a plurality of light emitting faces arranged in a predetermined first direction, the light-reception unit includes a plurality of light receiving faces arranged in a direction corresponding to the first direction, the plurality of light emitting faces correspond to the plurality of light receiving faces, and if it is determined that the intensity of the second light incident on a light receiving face of the plurality of light receiving face corresponding to each of the plurality of light emitting faces is greater than or equal to a predetermined threshold, the controller controls light emission of the plurality of light emitting faces to thereby change the light distribution pattern.

<Appendix 2>

The headlight device of Appendix 1, wherein the plurality of light emitting faces are N (where N is an integer of two or more) light emitting face arranged in the first direction, the plurality of light receiving faces are M (where M is an integer of two or more) light receiving face arranged in a direction corresponding to the first direction, and M is larger than N.

<Appendix 3>

The headlight device of Appendix 1 or 2, wherein a size of a light receiving region formed by the plurality of light receiving faces is larger than a size of an irradiated region of the first light.

<Appendix 4>

The headlight device of Appendix 2 or 3, wherein M is Q times (where Q is an integer of two or more) as large as N, and one of the N light emitting faces corresponds to Q adjacent light receiving faces of the M light receiving faces, and the controller controls light emission of the N light emitting faces based on signals output from the Q light receiving faces respectively corresponding to the N light emitting faces of the M light receiving faces to thereby cause the light source unit to adjust the light distribution pattern.

<Appendix 5>

The headlight device of any one of Appendices 1 to 4, wherein the light distribution changing lens has power different from power of the condenser lens.

<Appendix 6>

The headlight device of any one of Appendices 2 to 5, wherein the light distribution changing lens has first positive power in the first direction, and has second positive power in a second direction orthogonal to the first direction, the second positive power being different from the first positive power.

<Appendix 7>

The headlight device of any one of Appendices 1 to 6, wherein if it is determined that the number of times the intensity of the second light detected by the light-reception unit is greater than or equal to the threshold reaches a predetermined reference number of times or more within a predetermined time, the controller causes the light source unit to adjust the light distribution pattern.

<Appendix 8>

The headlight device of any one of Appendices 1 to 7, wherein the controller causes the light source unit to adjust the light distribution pattern based on the intensity of the second light detected by the light-reception unit in a turn-off time in which the light source unit is turned off.

<Appendix 9>

The headlight device of Appendix 8, wherein the controller controls the light source unit so that an operation in which the light source unit is turned on in a predetermined turn-on time and is turned off in the turn-off time shorter than the turn-on time is repeated.

<Appendix 10>

The headlight device of any one of Appendices 1 to 9, wherein the plurality of light emitting faces are arranged in a matrix in which J (where J is an integer of two or more) light emitting faces are arranged in a second direction orthogonal to the first direction and N (where N is an integer of two or more) light emitting faces are arranged in the first direction, the J light emitting faces arranged in the second direction of the plurality of light emitting faces correspond to one light receiving face of the plurality of light receiving faces, and the controller controls light emission of each of the plurality of light emitting faces arranged in the matrix based on a signal output from the one light receiving face corresponding to the J light emitting faces arranged in the second direction to thereby cause the light source to adjust the light distribution pattern.

<Appendix 11>

The headlight device of any one of Appendices 1 to 10, wherein the optical member is a beam splitter that allows the first light to pass through the beam splitter and emits the first light to the emission direction and reflects the incident light to emit the incident light as the second light toward the light-reception unit.

<Appendix 12>

The headlight device of any one of Appendices 1 to 10, wherein the optical member is a beam splitter that reflects the first light to emit the first light in the emission direction and causes the incident light to pass through the beam splitter to emit the incident light as the second light toward the light-reception unit.

<Appendix 13>

A headlight device including a plurality of headlight modules, and each of the plurality of headlight modules includes:

a light source unit to emit first light;

a first optical unit to change a light distribution pattern of the first light incident on the first optical unit;

a light-reception unit that detects incident second light;

a second optical unit to project the light distribution pattern in a predetermined projection direction and receive incident light traveling in a direction opposite to the projection direction, a third optical unit to emit the first light toward the second optical unit and emit the incident light that has passed through the second optical unit as the second light traveling toward the light-reception unit; and a fourth optical unit to focus the second light emitted from the third optical unit and direct toward the light-reception unit, and a part of an optical axis of a projection optical system including the light source unit, the first optical unit, and the second optical unit coincides with a part of an optical axis of an image pickup optical system including the second optical unit, the fourth optical unit, and the light-reception unit, and the light distribution pattern is controlled based on a detection result of the second light in the light-reception unit.

DESCRIPTION OF REFERENCE CHARACTERS

1, 21, 31 light source unit, 2 first optical unit, 3 second optical unit, 4, 14, 24, 34, 44 light-reception unit, 5 third optical unit, 6 fourth optical unit, 7 controller, 11, 211, 311 light emitting face, 20 light distribution changing lens, 41, 141a, 241, 341, 441 light receiving face, 60 condenser lens, 100, 400 headlight device, 110 projection optical system, 120 image pickup optical system, L0, L1 first light, L2 incident light, L3 second light.

What is claimed is:

1. A headlight device comprising:
   a light source unit to emit first light, the light source unit including a plurality of controlled units being capable of controlling amount of light emission independently;
   a first optical unit to change a light distribution pattern of the first light incident on the first optical unit;
   a light-reception unit to detect incident second light, the light-reception unit including a plurality of detection units being corresponding to the plurality of controlled units and being capable of detecting amount of receiving light independently;
   a second optical unit to project the light distribution pattern in a predetermined projection direction and receive incident light traveling in a direction opposite to the projection direction;
   a third optical unit to emit the first light traveling toward the second optical unit and emit the incident light that has passed through the second optical unit as the second light traveling toward the light-reception unit; and
   a fourth optical unit to focus the second light emitted from the third optical unit and direct toward the light-reception unit, wherein
   a part of an optical axis of a projection optical system including the light source unit, the first optical unit and the second optical unit coincides with a part of an optical axis of an image pickup optical system including the second optical unit, the fourth optical unit and the light-reception unit;
   wherein the first optical unit forms the light distribution pattern in which an aspect ratio of each light emitting face of a plurality of light emitting faces as the plurality of controlled units is enlarged in a vertical direction of the headlight device; and
   a first position and a second position overlap with each other or the first position is shifted within a range of ±2 mm or less from a second position in a horizontal direction of the headlight device, the first position being a position of the plurality of light emitting faces, the second position being a position of a synthesis focal point formed of the first optical unit and the second optical unit,
   the light distribution pattern is controlled by changing the amount of emission of controlled units corresponding to the plurality of detection units based on a detection result of the second light in the plurality of detection units of the light-reception unit.

2. The headlight device according to claim 1, wherein the plurality of detection units have a one-to-one correspondence with the plurality of controlled units.

3. The headlight device according to claim 1, wherein the second optical unit is a light distribution changing lens,
   the fourth optical unit is a condenser lens, and
   the light distribution changing lens has a refractive power different from a refractive power of the condenser lens.

4. The headlight device according to claim 1, further comprising:
   a controller to change an amount of light emission of the corresponding one of the plurality of controlled units based on the detection result in the plurality of detection units of the light-reception unit and change the light distribution pattern.

5. The headlight device according to claim 4, wherein the controller controls the light distribution pattern by turning on or off the corresponding one of the plurality of controlled units.

6. The headlight device according to claim 1, wherein with respect to lengths in the vertical direction of the headlight device, a detected region in at least one of the plurality of detection units is larger than an irradiated region of the first light emitted from the corresponding one of the plurality of controlled units.

7. The headlight device according to claim 1, wherein with respect to lengths in the horizontal direction of the headlight device, a light-reception region in the light-reception unit that detects the second light is larger than an irradiated region of the first light emitted from the light source unit.

8. The headlight device according to claim 1, wherein a distance from an imaginary projection plane to the focal point of the fourth optical unit at the side to the light-reception unit is substantially equal to another distance from the imaginary projection plane to the synthesis focal point, the imaginary projection plane being a plane at a location at which the light-reception unit is focused.

9. The headlight device according to claim 1, wherein a degree of blurring of edge of the light distribution pattern in the horizontal direction of the headlight device is larger than another degree of blurring of another edge of the light distribution pattern in the vertical direction of the headlight device.

10. The headlight device according to claim 4, wherein the light-reception unit further includes another detection unit being adjacent to the plurality of detection unit in the horizontal direction of the headlight device.

11. The headlight device according to claim 10, wherein the controller controls the light distribution pattern by changing amount of light emission of the corresponding one of the plurality of controlled units based on another detection result of the second light in another detection unit.

* * * * *